United States Patent
Byun

(10) Patent No.: US 10,454,309 B2
(45) Date of Patent: Oct. 22, 2019

(54) WIRELESS POWER TRANSMITTER AND METHOD OF CONTROLLING THE SAME

(71) Applicant: Samsung Electronics Co., Ltd., Suwon-si, Gyeonggi-do (KR)

(72) Inventor: Kang-Ho Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 15/138,723

(22) Filed: Apr. 26, 2016

(65) Prior Publication Data

US 2017/0085133 A1 Mar. 23, 2017

(30) Foreign Application Priority Data

Sep. 22, 2015 (KR) .................... 10-2015-0134025

(51) Int. Cl.
*H02J 50/12* (2016.01)
*H02J 50/20* (2016.01)
(Continued)

(52) U.S. Cl.
CPC ............ *H02J 50/12* (2016.02); *H02J 7/025* (2013.01); *H02J 50/20* (2016.02); *H02J 50/80* (2016.02)

(58) Field of Classification Search
CPC ............ H02J 5/005; H02J 7/025; H02J 17/00; H02N 2/008; H04B 5/0025–5/0093; B60L 5/005; B60L 11/182; B60L 11/1829–11/1831; Y02T 90/122; H01F 27/006; H01F 27/02; H01F 38/14; H01F 2038/143–2038/146; H01R 13/6633; A61B 1/00029; A61N 1/3787
(Continued)

(56) References Cited

U.S. PATENT DOCUMENTS

2008/0197804 A1* 8/2008 Onishi .................... H02J 7/025
                                                               320/108
2008/0200119 A1* 8/2008 Onishi ................ H04B 1/3883
                                                                455/41.1
(Continued)

FOREIGN PATENT DOCUMENTS

KR  10-2012-0128554 A  11/2012
KR  10-2013-0043829 A  5/2013

OTHER PUBLICATIONS

Quentin Bichon, Optimizing the THS4509 to Drive High-Speed ADC, Mar. 2014, all pages.*

*Primary Examiner* — Rexford N Barnie
*Assistant Examiner* — Thai H Tran
(74) *Attorney, Agent, or Firm* — Jefferson IP Law, LLP

(57) ABSTRACT

A method for controlling a wireless power transmitter transmitting wireless power to a wireless power receiver is provided. The method includes generating a first differential signal for the wireless power transmitted to the wireless power receiver, measuring a second differential signal corresponding to the first differential signal applied to a resonating unit of the wireless power transmitter, and detecting at least one of an amplitude and a phase of the second differential signal according to a measurement result, and controlling at least one of the amplitude and the phase of the second differential signal according to a detect result, and controlling the wireless power transmitter based on information on the controlled second differential signal.

18 Claims, 17 Drawing Sheets

(51) Int. Cl.
*H02J 50/80* (2016.01)
*H02J 7/02* (2016.01)

(58) Field of Classification Search
USPC .......................................... 307/104; 320/108
See application file for complete search history.

(56) References Cited

U.S. PATENT DOCUMENTS

| | | | |
|---|---|---|---|
| 2009/0001932 A1* | 1/2009 | Kamijo | H02J 5/005 320/108 |
| 2013/0082536 A1* | 4/2013 | Taylor | H02J 7/025 307/104 |
| 2013/0099732 A1 | 4/2013 | Lee et al. | |
| 2013/0293028 A1 | 11/2013 | Byun et al. | |

* cited by examiner

WIRELESS POWER TRANSMITTER AND METHOD OF CONTROLLING THE SAME

CROSS-REFERENCE TO RELATED APPLICATION(S)

This application claims the benefit under 35 U.S.C. § 119(a) of a Korean patent application filed on Sep. 22, 2015 in the Korean Intellectual Property Office and assigned Serial number 10-2015-0134025, the entire disclosure of which is hereby incorporated by reference.

TECHNICAL FIELD

The present disclosure relates to a wireless power transmitter and a method of controlling the wireless power transmitter. More particularly, the present disclosure relates to a wireless power transmitter capable of controlling an amplitude and a phase difference of a differential signal and a method of controlling the wireless power transmitter.

BACKGROUND

Mobile terminals, such as a mobile phone, a personal digital assistant (PDA), and the like, are driven with rechargeable batteries due to their nature, and the battery of the mobile terminal is charged through supplied electronic energy by using a separate charging apparatus. Typically, the charging device and the battery have separate contact terminals at an exterior thereof, respectively, and are electrically connected with each other by contacting the contact terminals.

However, in such a contact-type charging scheme, the contact terminals protrude outwardly, and thus are easily contaminated by rogue objects. As a result, battery charging is not correctly performed. Further, the battery charging may also not be correctly performed in a case where the contact terminal is exposed to moisture.

Currently, a wireless charging or a non-contact charging technology is developed and used for electronic devices to address the above-mentioned issue.

The wireless charging technology uses wireless power transmission and reception, and corresponds to, for example, a system in which a battery is automatically charged if the battery is just put on a charging pad without connecting the mobile phone to a separate charging connector. Generally, a wireless vibration tooth brush or a wireless electric shaver is known to an ordinary person. The wireless charging technology can improve a waterproof function because the wireless charging technology can be used to wirelessly charge the electronic devices. The wireless charging technology can improve the portability of the electronic devices because the wireless charging technology does not require a wired charger. Therefore, it is expected that technologies related to the wireless charging technology will be significantly developed in the coming age of electric cars.

The wireless charging technology largely includes an electromagnetic induction scheme using a coil, a resonance scheme using a resonance, and a radio frequency (RF)/microwave radiation scheme converting electrical energy to a microwave and then transmitting the microwave.

It is considered up to now that the electromagnetic induction scheme is mainstream, but it is expected that the day will come when all electronic products are wirelessly charged, anytime and anywhere, without a wire in the near future on the strength of recent successful experiments for wirelessly transmitting power to a destination spaced away by dozens of meters through the use of microwaves at home and abroad.

A power transmission method through the electromagnetic induction corresponds to a scheme of transmitting electric power between a first coil and a second coil. When a magnetic is moved in a coil, induction current occurs. By using the induction current, a magnetic field is generated at a transferring end, and electric current is induced according to a change of the magnetic field so as to make energy at a reception end. The phenomenon is referred to as the magnetic induction, and the electric power transmission method using magnetic induction has high energy transmission efficiency.

With respect to the resonance scheme, Prof. Soljacic of the Massachusetts Institute of Technology (MIT) announced a system in which electricity is wirelessly transferred using an electric power transmission principle of the resonance scheme based on a coupled mode theory even if a device to be charged is separated from a charging device by several meters. A wireless charging system of an MIT team employs a concept in physics that resonance is the tendency in which when a tuning fork is at a particular frequency, a wine glass next to the tuning fork oscillates at the same frequency. The research team makes an electromagnetic wave containing electrical energy resonate instead of making sounds resonate. It is known that the resonant electrical energy does not affect surrounding machines and human bodies differently from other electromagnetic waves because the resonant electrical energy is directly transferred only to a device having a resonance frequency and the unused part of the resonant electrical energy is reabsorbed into an electromagnetic field instead of spreading into the air.

Meanwhile, active researches on a wireless charging method are currently being progressed, but standards for a wireless charging order, a search for a wireless power transmitter/receiver, selection of a communication frequency between the wireless power transmitter/receiver, a wireless power control, selection of a matching circuit, communication time distribution to each wireless power receiver in one charging cycle have not been proposed. More particularly, it is required to propose a standard for a configuration and a procedure in which the wireless power receiver selects the wireless power transmitter to receive wireless power.

The wireless power transmitter and the wireless power receiver may communicate based on a certain scheme, for example, a Zig-bee scheme or a Bluetooth low energy scheme. By using an out-band scheme, such as the Zig-bee scheme or the Bluetooth low energy scheme, the available distance of communication increases. Thus, the wireless power transmitter and the wireless power receiver may perform communication even though the wireless power transmitter and the wireless power receiver are located at a relatively far distance. For example, the wireless power transmitter may perform communication with the wireless power receiver even though the wireless power transmitter is located at a relatively far distance where wireless power cannot be transmitted.

In a wireless power transmitter using the existing differential signal, there are problems in which the amplitudes and phase differences of two signals in the differential signal do not correspond according to positions of the resonance unit of the wireless power transmitter and the resonance unit of the wireless power receiver. Thus, there are problems in which it is difficult for the wireless power transmitter to maintain a wireless power transmission efficiency and the harmonic wave restrain nature is deteriorated.

Therefore, a need exists for a wireless power transmitter capable of controlling an amplitude and a phase difference of a differential signal and a method of controlling the wireless power transmitter.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless power transmitter and a method of controlling the wireless power transmitter, which measures a differential signal that is applied to a resonance unit, and controls the differential signal based on a measurement result in the wireless power transmitter using the differential signal.

In accordance with an aspect of the present disclosure, a method for controlling a wireless power transmitter transmitting wireless power to a wireless power receiver is provided. The method includes generating a first differential signal for the wireless power transmitted to the wireless power receiver, measuring a second differential signal corresponding to the first differential signal applied to a resonating unit of the wireless power transmitter, and detecting at least one of an amplitude and a phase of the second differential signal according to a measurement result, and controlling at least one of the amplitude and the phase of the second differential signal according to a detect result, and controlling the wireless power transmitter based on information on the controlled second differential signal.

The controlling of the at least one of the amplitude and the phase of the second differential signal may comprise controlling at least one of an amplitude and a phase of the first differential signal.

The information on the controlled second differential signal may include at least one of voltage values, current values of two signals in the second differential signal, and a phase difference value between the two signals.

The controlling of the at least one of the amplitude and the phase of the second differential signal may comprise maintaining the amplitude and the phase of the second differential signal when an amplitude and a phase of the differential signal are in a certain reference range.

The controlling of the at least one of the amplitude and the phase of the second differential signal may comprise controlling the amplitude and the phase of the second differential signal when an amplitude and a phase of the differential signal are not in a certain reference range.

The controlling of the wireless power transmitter may further comprise determining an impedance change corresponding to the wireless power receiver, based on the information on the controlled second differential signal.

The controlling of the wireless power transmitter may comprise determining an impedance change of the wireless power receiver based on the information on the controlled second differential signal, and entering to a latch fault mode according to a determination result.

The controlling of the at least one of the amplitude and the phase of the second differential signal may comprise controlling at least one of the amplitude and the phase of the second differential signal based on information on wireless power received by the wireless power receiver.

The controlling of the at least one of the amplitude and the phase of the second differential signal may be performed in a period from a time when the wireless power transmitter transmits the wireless power to a time when the information on the wireless power is requested to the wireless power receiver.

In accordance with another aspect of the present disclosure, a wireless power transmitter transmitting wireless power to a wireless power receiver is provided. The wireless power transmitter includes a signal dividing unit configured to output a first differential signal for the wireless power, a resonating unit configured to transmit the wireless power using a second differential signal corresponding to the first differential signal, an AC measuring unit configured to measure the second differential signal applied to the resonating unit, and a controller configured to control at least one of an amplitude and a phase of the second differential signal based on a result measured by the AC measuring unit, and control the wireless power transmitter based on information on the controlled second differential signal.

The controller may control the signal dividing unit such that the signal dividing unit controls at least one of an amplitude and a phase of the first differential signal in order to control at least one of the amplitude and the phase of the second differential signal.

The controller may control a variable resistor in order to control at least one of the amplitude and the phase of the first differential signal.

The information on the controlled second differential signal may include at least one of voltage values, current values of two signals in the second differential signal, and a phase difference value between the two signals.

The controller may determine an impedance change corresponding to the wireless power receiver, based on the information on the controlled second differential signal.

The controller may determine an impedance change of the wireless power receiver, based on the information on the controlled second differential signal, and may determine an entrance-or-not into a latch fault mode according to a determination result.

The controller may control at least one of the amplitude and the phase of the second differential signal, based on information on the wireless power received from the wireless power receiver.

The controller may control at least one of the amplitude and the phase of the second differential signal in a period from a time when the wireless power transmitter transmits the wireless power to a time when the information on the wireless power is requested to the wireless power receiver.

The controller may determine an impedance change of the wireless power receiver, and may initialize the wireless power transmitter according to a determination result.

The wireless power transmitter may further comprise a memory that stores the information on the second differential signal.

A wireless power transmitter according to an embodiment of the present disclosure measures a differential signal applied to a resonating unit and controls the amplitudes and the phase difference of two signals in the differential signal based on a measurement result. Therefore, the wireless power transmitter according to an embodiment of the present disclosure can effectively transmit wireless power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, a concept of a wireless charging system which may be applied to an embodiment of the present disclosure is described with reference to FIGS. 1 to 11, and a wireless power transmitter according to various embodiments of the present disclosure is described with reference to FIGS. 12 to 19.

Figure 1:
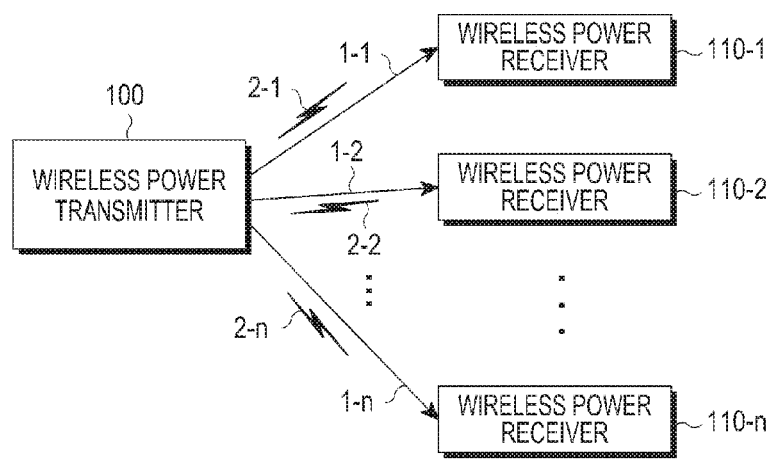
FIG. 1 illustrates a concept describing general operations of a wireless charging system according to an embodiment of the present disclosure.

FIG. 1 illustrates a concept describing general operations of a wireless charging system according to an embodiment of the present disclosure.

Referring to FIG. 1, a wireless charging system includes a wireless electric power transmitter 100 and one or more wireless electric power receivers 110-1, 110-2, . . . , and 110-n.

The wireless electric power transmitter 100 may wirelessly transmit electric power 1-1, 1-2, . . . , and 1-n to the one or more wireless electric power receivers 110-1, 110-2, . . . , and 110-n, respectively. More particularly, the wireless power transmitter 100 may wirelessly transmit electric power 1-1, 1-2, . . . , and 1-n to only a wireless power receiver which is authenticated through a certain authentication procedure.

The wireless electric power transmitter 100 may achieve an electrical connection with the wireless electric power receivers 110-1, 110-2, . . . , and 110-n. For example, the wireless power transmitting unit 100 may transmit wireless electric power in a form of electromagnetic waves to the wireless power receivers 110-1, 110-2, . . . , and 110-n.

Meanwhile, the wireless electric power transmitter 100 may perform bidirectional communication with the wireless electric power receivers 110-1, 110-2, . . . , and **110-*n*. Here, the wireless power transmitter 100 and the wireless power receiver 110-1, 110-2, . . . , and 110-*n* may process packets 2-1, 2-2, . . . , 2-*n*** including a certain number of frames, or transmit and receive the packets. The frames will be described below. More particularly, the wireless electric power receiver may be implemented with a mobile communication terminal, a personal digital assistant (PDA), a portable multimedia player (PMP), a smart phone, and the like.

The wireless electric power transmitter 100 may wirelessly provide electric power to a plurality of wireless electric power receivers 110-1, 110-2, . . . , and **110-*n*. For example, the wireless power transmitter 100 may transmit electric power to the plurality of wireless power receiver 110-1, 110-2, . . . , and 110-*n* through a resonant scheme. When the wireless electric power transmitter 100 adopts the resonant scheme, it is preferable that a distance between the wireless electric power transmitter 100 and the plurality of wireless electric power receivers 110-1, 110-2, . . . , and 110-*n* is equal to or shorter than 30 m. Further, when the wireless electric power transmitter 100 adopts the electromagnetic induction scheme, it is preferable that a distance between the wireless electric power transmitter 100 and the plurality of wireless electric power receivers 110-1, 110-2, . . . , and 110-*n*** is equal to or shorter than 10 cm.

The wireless electric power receivers 110-1, 110-2, . . . , and **110-*n* may receive wireless electric power from the wireless electric power transmitter 100 to charge batteries therein. Further, the wireless power receiver 110-1, 110-2, . . . , and 110-*n* may transmit a signal to request a wireless power transmission, information necessary for a reception of wireless electric power, information on a status of the wireless power receiver, or information on a control of the wireless power transmitter 100 to the wireless power transmitter 100**. Information on the transmission signal will be described below.

Further, the wireless power receivers 110-1, 110-2, . . . , and **110-*n* may transmit a message indicating a charging state of each of the wireless electric power receivers 110-1, 110-2, . . . , and 110-*n* to the wireless power transmitter 100**.

The wireless electric power transmitter 100 may include a display unit and display a state of each of the wireless electric power receivers 110-1, 110-2, and **110-*n* based on the message received from each of the wireless electric power receivers 110-1, 110-2, . . . , and 110-*n*. Further, the wireless power transmitter 100 may also display a time expected to be spent until each of the wireless power receiving units 110-1, 110-2, . . . , and 110-*n*** is completely charged.

The wireless electric power transmitter 100 may transmit a control signal for making a wireless charging function disabled to each of the wireless electric power receivers 110-1, 110-2, . . . , and **110-*n*.** The wireless power receiver received the disable control signal of the wireless charging function from the wireless power transmitter may disable the wireless charging function.

Figure 2:
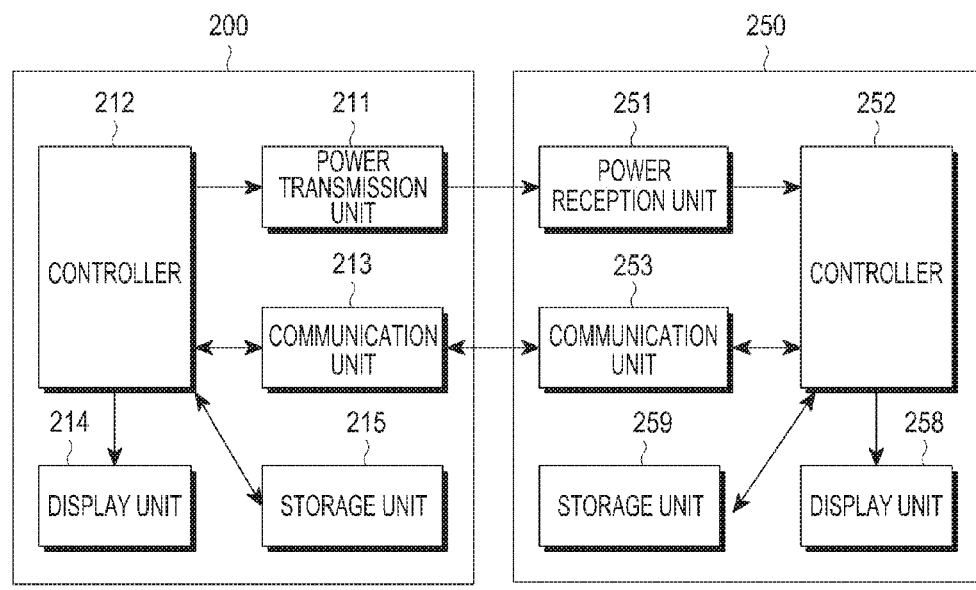
FIG. 2 illustrates a wireless power transmitter and a wireless power receiver according to an embodiment of the present disclosure.

FIG. 2 illustrates a wireless power transmitter and a wireless power receiver according to an embodiment of the present disclosure.

Referring to FIG. 2, a wireless power transmitter 200 may include at least one of a power transmitter 211, a controller 212, a communication unit 213, a display unit 214, and a storage unit 215.

The power transmitter 211 may supply power which is required by the wireless power transmitter 200, and wirelessly provide power to the wireless power receiver 250. Here, the power transmitter 211 may supply power in an alternating current (AC) waveform type, or convert power of a direct current (DC) waveform type to the power of the AC waveform type by using an inverter and supply the power in the AC waveform type. The power transmitter 211 may be implemented in a form of an embedded battery or in a form of a power receiving interface so as to receive the power from outside thereof and supply the power to the other components. It will be easily understood by those skilled in the art that the power transmitter 211 is not limited if the power transmitter 211 supplies power of constant alternate current waves.

The controller 212 may control overall operations of the wireless power transmitter 200. The controller 212 may control an overall operation of the wireless power transmitter 200 by using an algorithm, a program, or an application which is required for a control read from a storage unit 215. The controller 212 may be implemented in a form of a central processing unit (CPU), a microprocessor, or a mini computer.

The communication unit 213 may communicate with the wireless power receiver 250 in a specific manner. The communication unit 213 may receive power information from the wireless power receiver 250. Here, the power information may include at least one of a capacity of the wireless power receiver 250, a residual amount of the battery, the number of charging times, an amount of use, a battery capacity, and a proportion of the battery.

Further, the communication unit 213 may transmit a signal to control a charging function in order to control the charging function of the wireless power receiver 250. The signal of controlling the charging function may be a control signal of controlling the power receiver 251 of the specific wireless power receiver 250 so as to enable or disable the charging function. In addition, although described below, power information may also include information on a lead-in of a wired charging end, a conversion from a stand alone (SA) mode to a non stand alone (NSA) mode, an error situation release, and the like. In addition, the signal of controlling the charging function may be information on a determination of a crossing access according to various embodiments of the present disclosure. For example, the signal of controlling the charging function may include identification information for determining the crossing access, configuration information, and the like. In addition, the signal of controlling the charging function may include a pattern or time information related to a load change of the wireless power receiver 250 for determining the crossing access.

The communication unit 213 may receive a signal from another wireless power transmitter (not shown) as well as the wireless power receiver 250.

The controller 212 may display a state of the wireless power receiver 250 on the display unit 214 based on the message received from the wireless power receiver 250 through the communication unit 213. In addition, the controller 212 may display a time expected to be spent until the wireless power receiver 250 is completely charged.

In addition, as shown in FIG. 2, the wireless power receiver 250 may include at least one of a power receiving unit 251, a controller 252, a communication unit 253, a display unit 258 and a storage unit 259.

The power receiving unit 251 may wirelessly receive power transmitted from the wireless power transmitter 200.

Here, the power receiving unit 251 may receive power in a form of an alternating current waveform.

The controller 252 may control overall operations of the wireless power transmitter 250. The controller 252 may control overall operations of the wireless power transmitter 250 by using an algorithm, a program, or an application which is required for a control read from the storage unit 259. The controller 252 may be implemented in a form of a CPU, a microprocessor, or a mini computer.

The communication unit 253 may communicate with the wireless power receiver 250 in a specific manner. The communication unit 253 may transmit power information to the wireless power transmitter 200. Here, the power information may include at least one of a capacity of the wireless power receiver 250, a residual amount of the battery, the number of times of charging, an amount of use, a battery capacity, and a proportion of the battery.

Further, the communication unit 253 may transmit a signal of controlling a charging function in order to control the charging function of the wireless power receiver 250. The signal of controlling the charging function may be a control signal of controlling the power receiver 251 of the specific wireless power receiver 250 so as to enable or disable the charging function. In addition, although described below, power information may also include information on a lead-in of a wired charging end, a conversion from a SA mode to a NSA mode, an error situation release, and the like. In addition, the signal of controlling the charging function may be information on a determination of a crossing access according to various embodiments of the present disclosure. For example, the signal of controlling the charging function may include identification information for determining the crossing access, configuration information, and the like. In addition, the signal of controlling the charging function may include a pattern or time information related to a load change of the wireless power receiver 250 for determining the crossing access.

The controller 252 may control to display a state of the wireless power receiver 250 on the display unit 258. Further, the controller 252 may also display a time expected to be spent until the wireless power receiver is completely charged on the display unit 258.

Figure 3:
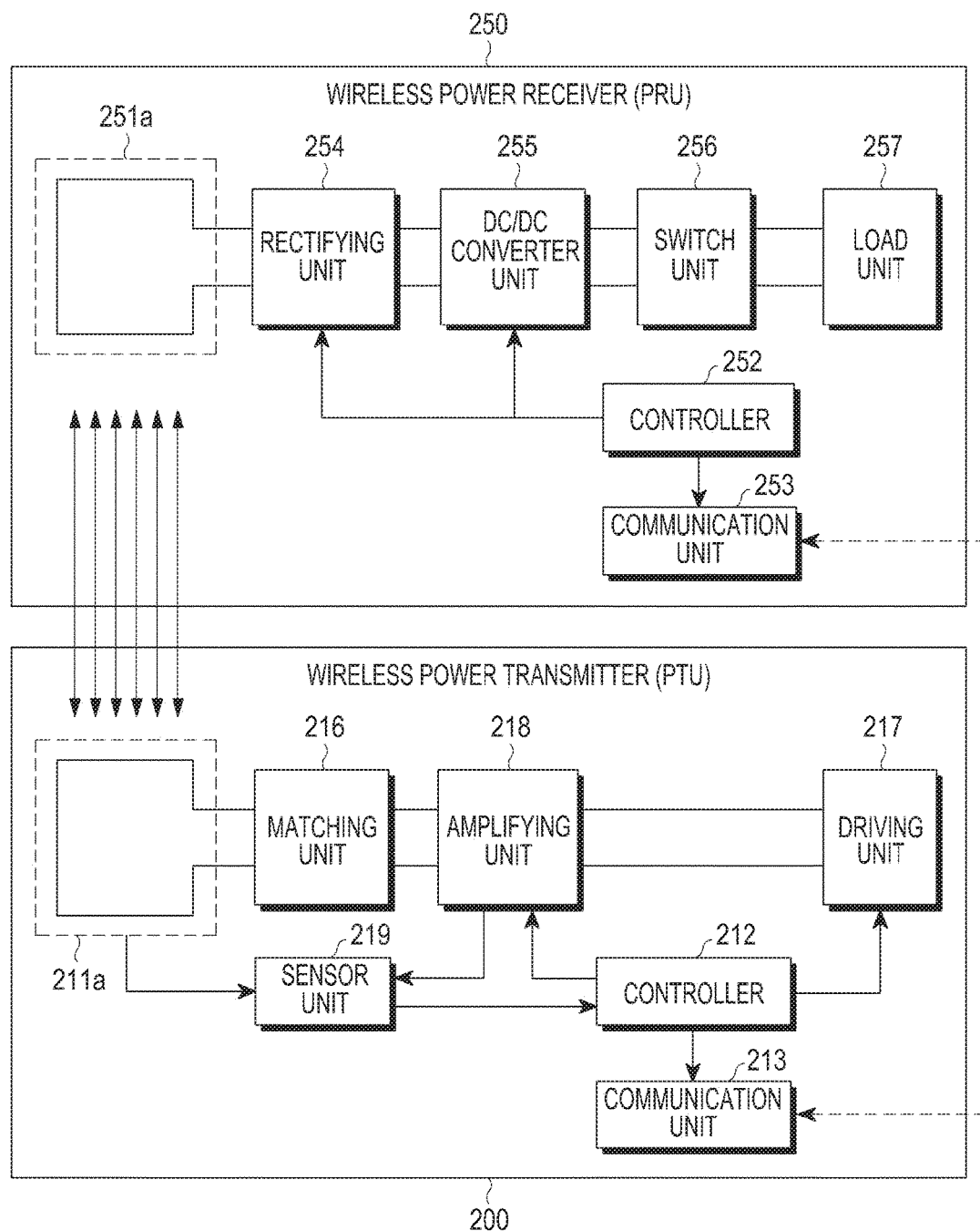
FIG. 3 is a block diagram illustrating a wireless power transmitter and a wireless power receiver according to an embodiment of the present disclosure.

FIG. 3 is a block diagram illustrating a wireless power transmitter and a wireless power receiver according to an embodiment of the present disclosure.

Referring to FIG. 3, the wireless power transmitter 200 may include at least one of a transmitting resonator (i.e., a Tx resonator) 211a, a controller 212 (e.g., a microcontroller (MCU)), a communication unit (e.g., an out-of-band signaling unit), a driving unit (e.g., a power supply) 217, an amplifying unit (e.g., a power amp) 218, a matching unit (e.g., a matching circuit) 216 and a detecting unit 219. The wireless power receiver 250 may include at least one of a receiving resonator (i.e., an Rx resonator) 251a, a controller 252, a communication unit 253, a rectifying unit (or a rectifier) 254, a DC/DC converter unit 255, a switch unit 256 and a load unit (e.g., a client device load) 257.

The driving unit 217 may output DC power having a preset voltage value. The voltage value of the DC power output from the driving unit 217 may be controlled by the controller 212.

The DC power output from the driving unit 217 may be output to the amplifying unit 218. The amplifying unit 218 may amplify the DC power by a preset gain. In addition, the DC power may be converted into AC power based on an input signal. Accordingly, the amplifying unit 218 may output the AC power.

The matching unit 216 may perform impedance matching. For example, the matching unit 216 adjusts impedance and controls the output power to have high efficiency or high capacity. The detecting unit 219 may detect a load change by the wireless power receiver 250 through the Tx resonator 211a or the amplifying unit 218.

The matching unit 216 may adjust the impedance based on the control of the controller 212. The matching unit 216 may include at least one of a coil and a capacitor. The controller 212 may control a state of a connection to at least one of the coil and the capacitor, and thus the impedance matching may be performed.

The Tx resonator 211a may transmit input alternating current power to the Rx resonator 251a. The Tx resonator 211a and the Rx resonator 251a may be implemented with a resonation circuit having the same resonation frequency. For example, the resonance frequency may be determined as 6.78 MHz. In an embodiment of the present disclosure, an inverter unit (not shown) may inverts the DC power from the driving unit 217 into the AC power and may output the AC power to the Tx resonator 211a.

Meanwhile, the communication unit 213 may perform communication with the communication unit 253 of the wireless power receiver 250, and for example, may perform communication (e.g., WiFi, Zegbee, and Bluetooth (BT)/Bluetooth low energy (BLE)) in a frequency of bidirectional 2.4 GHz).

The Rx resonator 251a may receive power for a charging.
The rectifying unit 254 may rectify wireless power received by the Rx resonator 251a power receiver 251 in the form of direct current, and is implemented in a form of a bridge diode. The DC/DC converter unit 255 may convert the rectified power in a certain gain. For example, the DC/DC converter unit 255 may convert the rectified power in such a manner that the output side thereof has a voltage of 5 V. Meanwhile, a minimum value and a maximum value of the voltage which may be applied to a front end of the DC/DC converter unit 255 may be configured in advance.

The switch unit 256 may connect the DC/DC converter unit 256 to the load unit 257. The switch unit 256 may be held in an on/off state under a control of the controller 252. Such a switch 256 may be omitted. In a case where the switch unit 256 is in the on state, the load unit 257 may store converted power which is input from the DC/DC converter unit 255.

Figure 4:
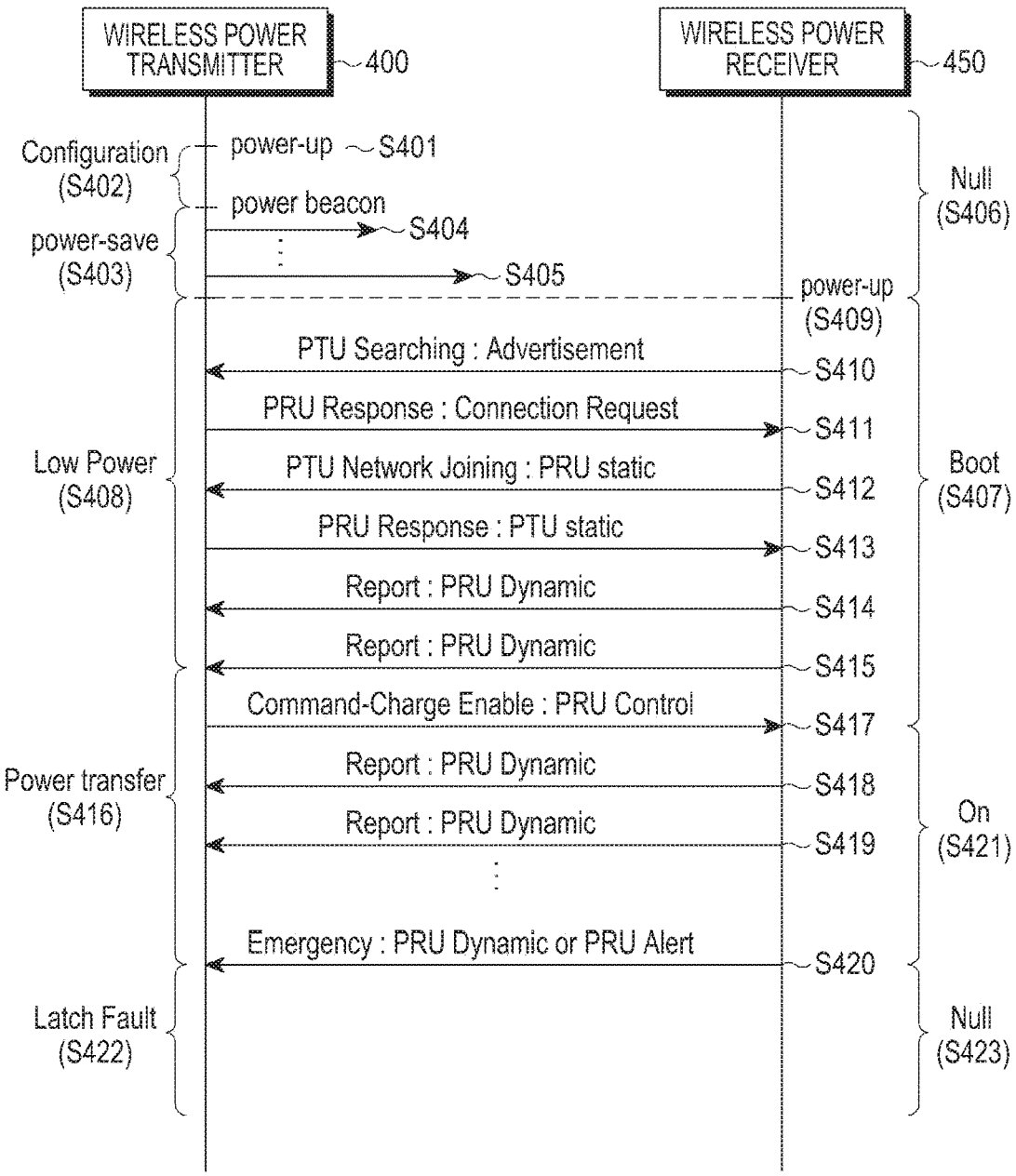
FIG. 4 is a flowchart for describing operations of a wireless power transmitter and a wireless power receiver according to an embodiment of the present disclosure.

FIG. 4 is a flowchart for describing operations of a wireless power transmitter and a wireless power receiver according to an embodiment of the present disclosure.

Referring to FIG. 4, a wireless power transmitter 400 may apply power at operation S401. When the power is applied, the wireless power transmitter 400 may configure an environment at operation S402.

The wireless power transmitter 400 may enter a power saving mode at operation S403. In power saving mode, the wireless power transmitter 400 may apply heterogeneous detection power beacons in respective periods, and this will be described below with reference to FIG. 6. For example, as shown in FIG. 4, the wireless power transmitter 400 may apply a detection power beacon (e.g., a short beacon or a long beacon) at operations S404 and S405. The sizes of the power values of the detection power beacons in S404 and S405 may be different. A part or all of the detection power beacons in S404 and S405 may have enough power to drive the communication unit of the wireless power receiver 450. At this time, the state may be referred to as a null state at operation S406.

The wireless power transmitter 400 may detect a load change by an arrangement of the wireless power receiver 450. The wireless power transmitter 400 may enter a low power mode at operation S408. The low power mode will be described below with reference to FIG. 6. Meanwhile, the wireless power receiver 450 may drive the communication unit based on power received from the wireless power transmitter 400 at operation S409.

The wireless power receiver 450 may transmit a wireless power transmitter (i.e., a power transmitting unit (PTU)) searching signal to the wireless power transmitter 400 at operation S410. The wireless power receiver 450 may transmit the PTU searching signal by using a BLE based advertisement signal. The wireless power receiver 450 may transmit the PTU searching signal periodically, and may transmit the PTU searching signal until the wireless power receiver 450 receives a response signal from the wireless power transmitter 400 or until a preset time period arrives.

When receiving the PTU searching signal from the wireless power receiver 450, the wireless power transmitter 400 may transmit a power receiving unit (PRU) response signal at operation S411. Here, the PRU response signal may establish a connection between the wireless power transmitter 400 and the wireless power receiver 400.

The wireless power receiver 450 may transmit a PRU static signal at operation S412. Here, the PRU static signal may be a signal indicating a state of the wireless power receiver 450, and may be used to request subscription to the wireless power network managed by the wireless power transmitter 400.

The wireless power transmitter 400 may transmit a PTU static signal at operation S413. The PTU static signal transmitted from the wireless power transmitter 400 may be a signal indicating a capability of the wireless power transmitter 400.

When the wireless power transmitter 400 and the wireless power receiver 450 transmit or receive the PRU static signal and the PTU static signal, the wireless power receiver 450 may periodically transmit a PRU dynamic signal at operations S414 and S415. The PRU dynamic signal may include information on at least one parameter measured by the wireless power receiver 450. For example, the PRU dynamic signal may include information on a voltage at a rear end of the rectifier of the wireless power receiver 450. The status of the wireless power receiver 450 may be referred to as a boot status S407.

The wireless power transmitter 400 may enter a power transmission mode at operation S416, and the wireless power transmitter 400 may transmit a PRU control signal which enables the wireless power receiver 450 to perform the charging at operation S417. In the power transmission mode, the wireless power transmitter 400 may transmit charging power.

The PRU control signal transmitted by the wireless power transmitter 400 may include information enabling/disabling the charging of the wireless power receiver 450 and permission information. The PRU control signal may be transmitted whenever a charging state is changed. The PRU control signal may be transmitted, for example, every 250 ms, or transmitted when a parameter is changed. The PRU control signal may be set to be transmitted within a preset threshold, for example, within one second even though the parameter is not changed.

The wireless power receiver 400 may change a configuration according to the PRU control signal and transmit the PRU dynamic signal for reporting the state of the wireless power receiver 450 at operations S418 and S419. The PRU dynamic signal transmitted by the wireless power receiver 450 may include at least one of information on a voltage, a current, a state of the wireless power receiver, and temperature. The state of the wireless power receiver 450 may be called an on state S421.

Meanwhile, the PRU dynamic signal may have a data structure as indicated in Table 1.

TABLE 1

| Field | octets | description | use | units |
|---|---|---|---|---|
| optional fields | 1 | defines which optional fields are populated | mandatory | |
| Vrect | 2 | DC voltage at the output of the rectifier. | mandatory | mV |
| Irect | 2 | DC current at the output of the rectifier. | mandatory | mA |
| Vout | 2 | voltage at charge battery port | optional | mV |
| Iout | 2 | current at charge battery port | optional | mA |
| temperature | 1 | temperature of PRU | optional | Deg C. from −40 C. |
| Vrect min dyn | 2 | The current dynamic minimum rectifier voltage desired | optional | mV |
| Vrect set dyn | 2 | desired Vrect (dynamic value) | optional | mV |
| Vrect high dyn | 2 | The current dynamic maximum rectifier voltage desired | optional | mV |
| PRU alert | 1 | warnings | mandatory | Bit field |
| RFU | 3 | undefined | | |

As shown in Table 1, the PRU dynamic signal may include one or more fields. The fields may include optional field information, voltage information of a back end of the rectifier of the wireless power receiver, current information of the back end of the rectifier of the wireless power receiver, voltage information of a back end of the DC/DC converter of the wireless power receiver, current information of the back end of the DC/DC converter of the wireless power receiver, temperature information, minimum voltage value information (VRECT_MIN_DYN) of the back end of the rectifier of the wireless power receiver, optimal voltage value information (VRECT_SET_DYN) of the back end of the rectifier of the wireless power receiver, maximum voltage value information (VRECT_HIGH_DYN) of the back end of the rectifier of the wireless power receiver, alert information (PRU alert), and the like. The PRU dynamic signal may include at least one of the above fields.

For example, one or more voltage setting values (for example, the minimum voltage value information (VRECT_MIN_DYN) of the back end of the rectifier of the wireless power receiver, the optimal voltage value information (VRECT_SET_DYN) of the back end of the rectifier of the wireless power receiver, and the maximum voltage value information (VRECT_HIGH_DYN) of the back end of the rectifier of the wireless power receiver) determined according to a charging state may be inserted into corresponding fields of the PRU dynamic signal and then transmitted. As described above, the wireless power receiver having received the PRU dynamic signal may control a wireless charging voltage to be transmitted to each of the wireless power receivers with reference to the voltage setting values included in the PRU dynamic signal.

Among them, the alert information (PRU Alert) may have a data structure shown in Table 2 below.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

Referring to Table 2, the alert information (PRU Alert) may include a bit for a restart request, a bit for a transition, and a bit for detecting an insertion of a travel adapter (TA) (TA detect). The TA detect indicates a bit informing of a connection between the wireless power transmitter providing wireless charging and a terminal for wired charging by the wireless power receiver. The bit for the transition indicates a bit informing the wireless power transmitter that the wireless power receiver is reset before a communication integrated circuit (IC) of the wireless power receiver is switched from a SA mode to a NSA mode. Lastly, the restart request indicates a bit informing the wireless power receiver that the wireless power transmitter is ready to restart the charging when the charging is disconnected since the wireless power transmitter reduces power due to the generation of an over current state or an over temperature state and then the state is returned to an original state.

Further, the alert information (PRU Alert) may also have a data structure shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3 above, the alert information may include over voltage, over current, over temperature, PRU self protection, charge compete, wired charger detect, mode transition, and the like. Here, when the over voltage field is set as "1", it may indicate that a voltage Vrect of the wireless power receiver exceeds a limit of the over voltage. Further, the over current and the over temperature may be set in the same way as the over voltage. In addition, the PRU self protection indicates that the wireless power receiver directly reduces the power load and thus protects itself. In this event, the wireless power transmitter is not required to change a charging state.

The bits for a mode transition according to an embodiment of the present disclosure may be configured as a value for notifying a period when all transition processes are progressed to the wireless power transmitter. The bits indicating the mode transition period may be expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4 above, '00' may indicate that there is no mode transition, '01' may indicate that a maximum time required to complete the mode transition is 2 seconds, '10' may indicate that the maximum time required to complete the mode transition is 3 seconds, and '11' may indicate that the maximum time required to complete the mode transition is 6 seconds.

For example, when a time that corresponds to, or is shorter than, 3 seconds is spent to complete the mode transition, the mode transition bit may be set as '10'. Prior to starting the mode transition process, the wireless power receiver may make a restriction such that there is no change in impedance during the mode transition process by changing an input impedance setting to match 1.1 W power draw. Accordingly, the wireless power transmitter may control power (ITX_COIL) for the wireless power receiver in accordance with the setting, and accordingly, maintain the power (ITX_COIL) for the wireless power receiver during the mode transition period.

Accordingly, when the mode transition period is set by the mode transition bit, the wireless power transmitter may maintain the power (ITX_COIL) for the wireless power receiver during the mode transition time, for example, three seconds. For example, a connection may be maintained although a response is not received from the wireless power receiver. However, after the mode transition time passes, the wireless power receiver may be considered as a rogue object and thus power transmission may be terminated.

Meanwhile, the wireless power receiver 450 may detect generation of errors. The wireless power receiver 450 may transmit an alert signal to the wireless power transmitter 400 at operation S420. The alert signal may be transmitted in the form of the PRU dynamic signal or a PRU alert signal. For example, the wireless power receiver 450 may transmit the PRU alert field of Table 1 reflecting an error state to the wireless power transmitter 400. Alternatively, the wireless power receiver 450 may transmit a single alert signal indicating the error state to the wireless power transmitter 400. When receiving the alert signal, the wireless power transmitter 400 may enter a latch fault mode at operation S422. The wireless power receiver 450 may enter a null state in at operation S423.

Figure 5:
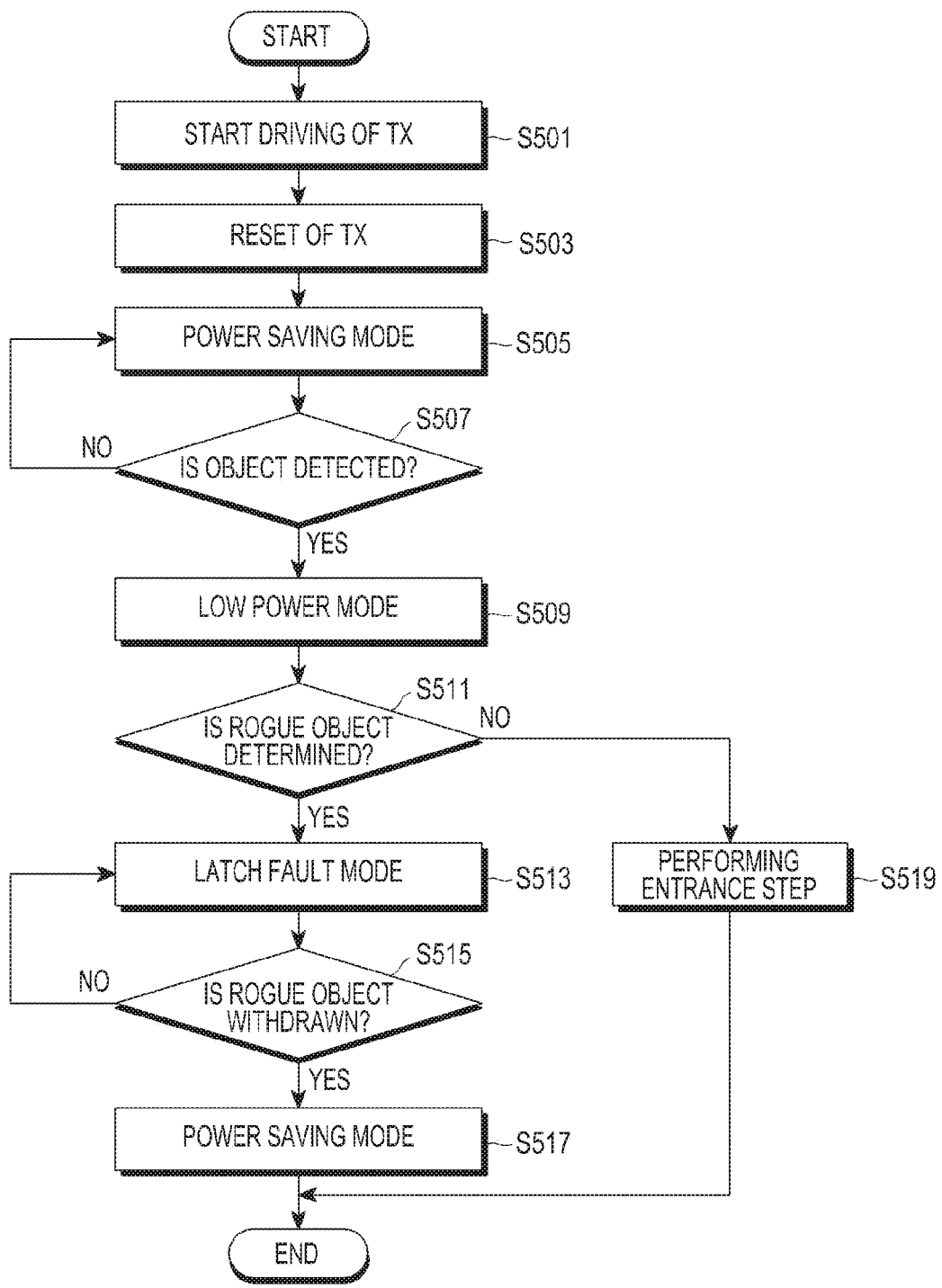
FIG. 5 is a flowchart illustrating operations of a wireless power transmitter and a wireless power receiver according to an embodiment of the present disclosure.

FIG. 5 is a flowchart illustrating operations of a wireless power transmitter and a wireless power receiver according to an embodiment of the present disclosure. The control method of FIG. 5 will be described below with reference to FIG. 6.

Figure 6:
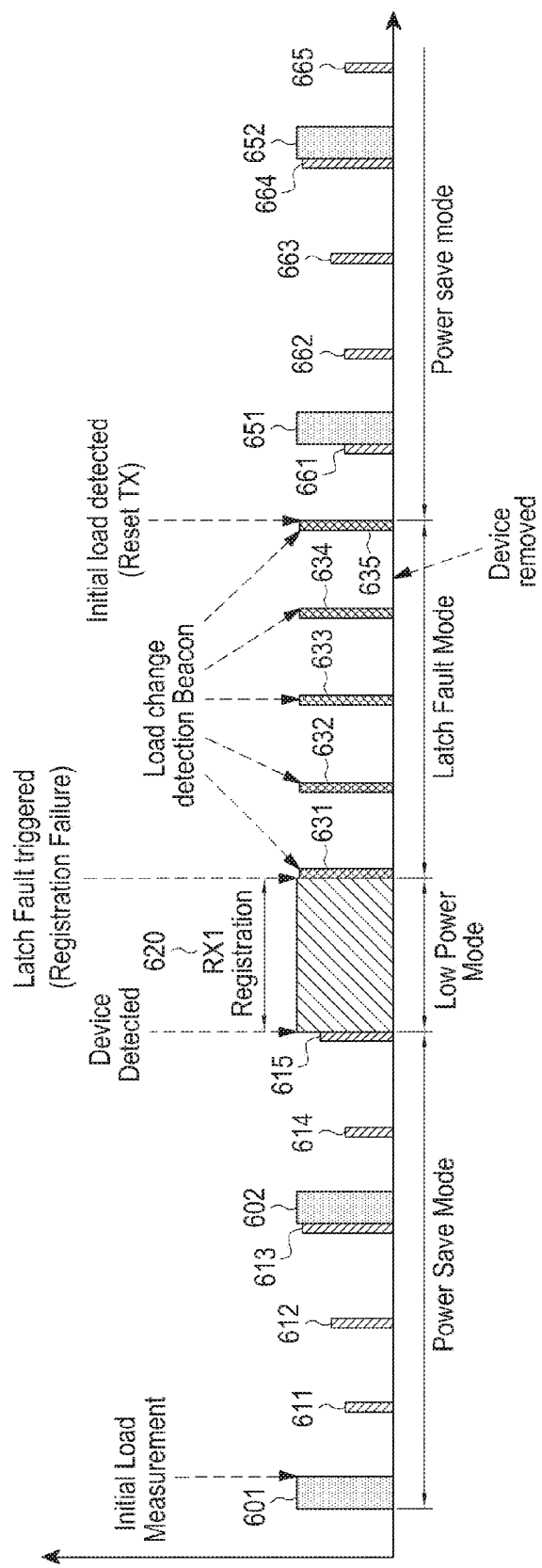
FIG. 6 is a graph on a time axis of an amount of power applied by a wireless power transmitter according to an embodiment of the present disclosure.

FIG. 6 is a graph on a time axis of an amount of power applied by a wireless power transmitter according to an embodiment of the present disclosure.

Referring to FIGS. 5 and 6, the wireless power transmitter may initiate a driving in operation S501. Further, the wireless power transmitter may reset an initial configuration in operation S503. The wireless power transmitter may enter a power saving mode in operation S505. Here, the power saving mode may be an interval where the wireless power transmitter applies power having different amounts to the power transmitter. For example, the power saving mode may be an interval where the wireless power transmitter applies second detection power 601 and 602 and third detection power 611, 612, 613, 614, and 615 of FIG. 6 to the power transmitter. Here, the wireless power transmitter may periodically apply the second detection power 601 and 602 by second period. When the wireless power transmitter applies the second detection power 601 and 602, the second power 601 and 602 may be continuously applied for a second term. The wireless power transmitter may periodically apply the third detection power 611, 612, 613, 614, and 615 by third period. When the wireless power transmitter applies the third detection power 611, 612, 613, 614, and 615, the third detection power 611, 612, 613, 614, and 615 may be continuously applied for a third term. Meanwhile, in the drawings, each power values of the third detection power 611, 612, 613, 614, and 615 is different, but each power values of the third detection power 611, 612, 613, 614, and 615 may be different or may be the same.

The wireless power transmitter may output the third detection power 611 and then output the third detection power 612 having the same size of the power amount. As described above, when the wireless power transmitter outputs the third detection power having the same size, the power amount of the third detection power may have a power amount by which a smallest wireless power receiver, for example, a wireless power receiver of category 1 can be detected.

Further, the wireless power transmitter may output the third power 611 and then output the third power 612, which has a different amount of power from that of the third power 611. When the wireless power transmitter outputs the third power having the different amount as described above, the amount of the third power may be a sufficient amount to detect a wireless power receiver of categories 1 to 5. For example, the third detection power 611 may have a power amount by which a wireless power receiver of category 5 can be detected, the third detection power 612 may have a power amount by which a wireless power receiver of category 3 can be detected, and the third detection power 613 may have a power amount by which a wireless power receiver of category 1 can be detected.

Meanwhile, the second detection power 601 and 602 may be power capable of driving the wireless power receiver. More specifically, the second detection power 601 and 602 may have a power amount which can drive the controller and/or the communication unit of the wireless power receiver.

The wireless power transmitter may apply the second detection power 601 and 602 to the power receiving unit in a second period and may apply the third detection power 611, 612, 613, 614, and 615 to the power receiving unit in a third period. When the wireless power receiver is disposed on the wireless power transmitter, an impedance from one point of the wireless power transmitter may be changed. The wireless power transmitter may detect the impedance change while applying the second detection power 601 and 602 and the third detection power 611, 612, 613, 614, and 615. For example, the wireless power transmitter may detect the impedance change while the third detection power 615 is applied. Accordingly, the wireless power transmitter may detect an object in operation S507. When the object is not detected in operation S507-N, the wireless power transmitter may maintain a power saving mode in which different power is periodically applied.

Meanwhile, when the impedance is changed, and thus the object is detected in operation S507-Y, the wireless power transmitter may enter a low power mode in operation S509. Here, the low power mode is a mode in which the wireless power transmitter applies driving power having a power amount by which the controller and the communication unit of the wireless power receiver can be driven. For example, in FIG. 6, the wireless power transmitter may apply driving power 620 to the power transmitter. The wireless power receiver may receive the driving power 620 to drive the controller and/or the communication unit. The wireless power receiver may perform communication with the wireless power transmitter according to a certain scheme based on the driving power 620. For example, the wireless power receiver may transmit/receive data required for authentication, and may subscribe to the wireless power network managed by the wireless power transmitter, based on the transmission/reception of the data. However, when a rogue object is arranged instead of the wireless power receiver, the data transmission/reception cannot be performed. Accordingly, the wireless power transmitter may determine whether the arranged object is the rogue object in operation S511. For example, when the wireless power transmitter does not receive a response from the object within a preset time, the wireless power transmitter may determine that the object as the rogue object.

If the object is determined as the rogue object in operation S511-Y, the wireless power transmitter may enter the latch fault mode in operation S513. In contrast, if it is determined that the object is not the rogue object in operation S511-N, an entering operation may be performed in operation S519. For example, the wireless power transmitter may periodically apply first power 631 to 635 of FIG. 6 in a first period. The wireless power transmitter may detect the impedance change during applying the first power. For example, when the rogue object is withdrawn in operation S515-Y, the impedance change may be detected and the wireless power transmitter may determine that the rogue object is withdrawn. In contrast, when the rogue object is not withdrawn in operation S515-N) the wireless power transmitter cannot detect the impedance change, and the wireless power transmitter may determine that the rogue object is not withdrawn. When the rogue object is not withdrawn, the wireless power transmitter may output at least one of a lamp and a warning sound to inform a user that a state of the wireless power transmitter is an error state. Accordingly, the wireless power transmitter may include an output unit configured to output at least one of the lamp and the warning sound.

When it is determined that the rogue object is not withdrawn in operation S515-N, the wireless power transmitter may maintain the latch fault mode in operation S513. Meanwhile, when it is determined that the rogue object is withdrawn in operation S515-Y, the wireless power transmitter may enter the power saving mode again in operation S517. For example, the wireless power transmitter may apply second power 651 and 652 and third power 661 to 665 of FIG. 6.

As described above, when the rogue object is arranged instead of the wireless power receiver, the wireless power transmitter may enter the latch fault mode. In addition, the wireless power transmitter may determine whether the rogue object is withdrawn, according to the impedance change based on the power applied in the latch fault mode. For example, a condition of the entrance into the latch fault mode in the embodiment of FIGS. 5 and 6 may be the arrangement of the rogue object. Meanwhile, the wireless power transmitter may have various latch fault mode entrance conditions as well as the arrangement of the rogue object. For example, the wireless power transmitter may be cross-connected with the arranged wireless power receiver and may enter the latch fault mode in the above case.

Accordingly, when the cross-connection is generated, the wireless power transmitter is required to return to an initial state and the wireless power receiver is required to be withdrawn. The wireless power transmitter may set the cross-connection, in which the wireless power receiver arranged on another wireless power transmitter enters the wireless power network, as a condition of entry into the latch fault mode. An operation of the wireless power transmitter when the error is generated which includes the cross-connection will be described with reference to FIG. 7.

Figure 7:
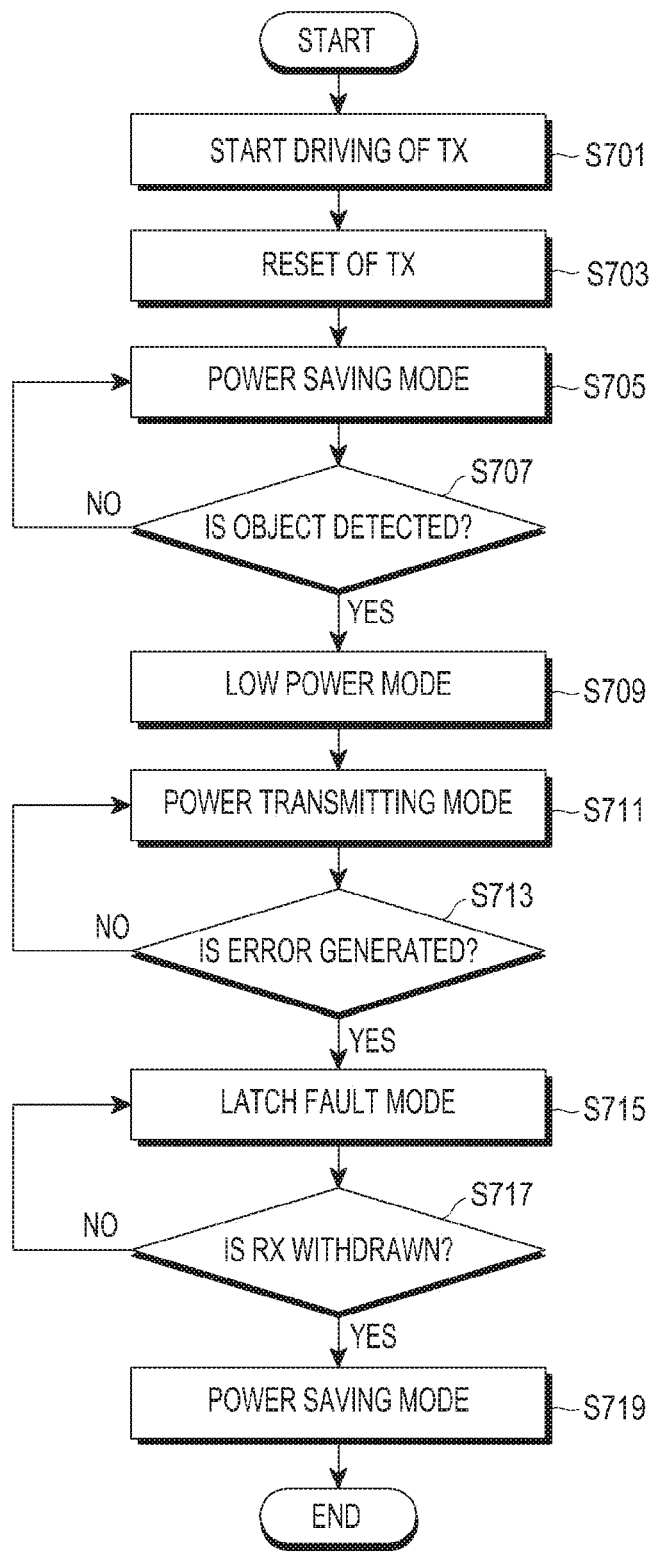
FIG. 7 is a flowchart illustrating a control method of a wireless power transmitter according to an embodiment of the present disclosure.

FIG. 7 is a flowchart illustrating a control method of a wireless power transmitter according to an embodiment of the present disclosure. The control method of FIG. 7 will be described below with reference to FIG. 8.

Figure 8:
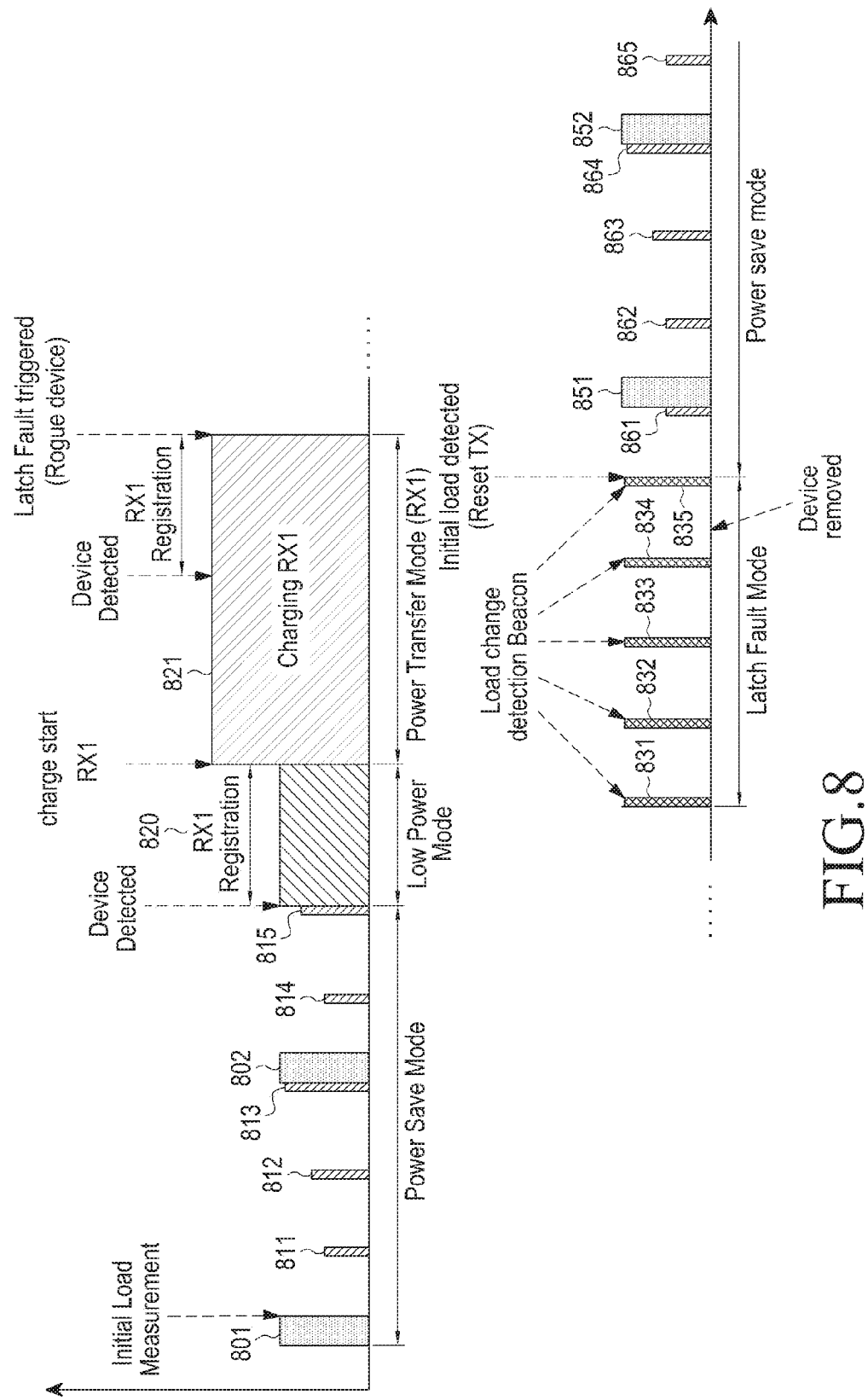
FIG. 8 is a graph on a time axis of an amount of power applied by a wireless power transmitter according to an embodiment of the present disclosure.

FIG. 8 is a graph on a time axis of an amount of power applied by a wireless power transmitter according to an embodiment of the present disclosure.

Referring to FIGS. 7 and 8, the wireless power transmitter may initiate a driving in operation S701. Further, the wireless power transmitter may reset an initial configuration in operation S703. The wireless power transmitter may enter a power saving mode in operation S705. Here, the power saving mode may be an interval where the wireless power transmitter applies power having different amounts to the power transmitter. For example, the power saving mode may be an interval where the wireless power transmitter applies second detection power 801 and 802 and third detection power 811, 812, 813, 814, and 815 of FIG. 8 to the power transmitter. Here, the wireless power transmitter may periodically apply the second detection power 801 and 802 by a second period. When the wireless power transmitter applies the second detection power 801 and 802, the second power 801 and 802 may be continuously applied for a second term. The wireless power transmitter may periodically apply the third detection power 811, 812, 813, 814, and 815 by third period. When the wireless power transmitter applies the third detection power 811, 812, 813, 814, and 815, the third detection power 811, 812, 813, 814, and 815 may be continuously applied for a third term. Meanwhile, in the drawings, each power values of the third detection power 811, 812, 813, 814, and 815 is different, but each power values of the third detection power 811, 812, 813, 814, and 815 may be different or may be the same.

Meanwhile, the second detection power 801 and 802 may be enough power to drive the wireless power receiver. More specifically, the second detection power 801 and 802 may have a power amount to drive the controller and/or the communication unit of the wireless power receiver.

The wireless power transmitter may apply the second detection power 801 and 802 to the power receiving unit in a second period and may apply the third detection power 811, 812, 813, 814, and 815 to the power receiving unit in a third period. When the wireless power receiver is disposed on the wireless power transmitter, impedance at a point of the wireless power transmitter may be changed. For example, the wireless power transmitter may detect the impedance change while applying the third detection power 815. Accordingly, the wireless power transmitter may detect an object in operation S707. When the object is not detected in operation S707-N, the wireless power transmitter may maintain the power saving mode in which different power is periodically applied in operation S705.

Meanwhile, when the impedance is changed and thus the object is detected in operation S707-Y, the wireless power transmitter may enter a low power mode in operation S709. Here, the low power mode is a mode in which the wireless power transmitter applies driving power having a power amount by which the controller and/or the communication unit of the wireless power receiver can be driven. For example, in FIG. 8, the wireless power transmitter may apply driving power 820 to the power transmitter. The wireless power receiver may receive the driving power 820 to drive the controller and/or the communication unit. The wireless power receiver may communicate with the wireless power transmitter according to a certain scheme based on the driving power 820. For example, the wireless power receiver may transmit/receive data required for authentication, and may subscribe to the wireless power network managed by the wireless power transmitter, based on the transmission/reception of the data.

Thereafter, the wireless power transmitter may enter the power transmission mode in which charging power is transmitted in operation S711. For example, the wireless power transmitter may apply charging power 821 and the charging power may be transmitted to the wireless power receiver as illustrated in FIG. 8.

The wireless power transmitter may determine whether an error is generated in the power transmission mode. Here, the error may be a disposition of a rogue object on the wireless power transmitter, a cross-connection, an over voltage, an over current, an over temperature, and the like. The wireless power transmitter may include a detecting unit that may measure the over voltage, the over current, over temperature, and the like. For example, the wireless power transmitter may measure a voltage or a current at a reference position. When the measured voltage or current is larger than a threshold, it is determined that conditions of the over voltage or the over current are satisfied. Alternatively, the wireless power transmitter may include a temperature detecting unit and the temperature detecting unit may measure temperature at a reference position of the wireless power transmitter. When temperature at the reference position is larger than a threshold, the wireless power transmitter may determine that a condition of the over temperature is satisfied.

Meanwhile, when an over voltage, over current, or over temperature state is determined according to a measurement value of the temperature, voltage, or current, the wireless power transmitter prevents the over voltage, over current, or over temperature by reducing the wireless charging power by a preset value. At this time, when a voltage value of the reduced wireless charging power is smaller than a preset minimum value (for example, the minimum voltage value (VRECT_MIN_DYN) of the back end of the rectifier of the wireless power receiver), the wireless charging is stopped, so that the voltage setting value may be re-controlled according to an embodiment of the present disclosure.

Although it has been illustrated that the error is generated since the rogue object is additionally arranged on the wireless power transmitter in the embodiment of FIG. 8, the error is not limited thereto and it will be easily understood by those skilled in the art that the wireless power transmitter operates through a similar process with respect to the arrangement of the rogue object, the cross-connection, the over voltage, the over current, and the over temperature.

When the error is not generated in operation S713-N, the wireless power transmitter may maintain the power transmission mode in operation S711. Meanwhile, when the error is generated in operation S713-Y, the wireless power transmitter may enter the latch fault mode in operation S715. For example, the wireless power transmitter may apply first power 831 to 835 as illustrated in FIG. 8. Further, the wireless power transmitter may output an error generation display including at least one of a lamp and a warning sound during the latch fault mode. When it is determined that the rogue object is not withdrawn in operation S717-N, the wireless power transmitter may maintain the latch fault mode in operation S715. Meanwhile, when it is determined that the rogue object is withdrawn in operation S717-Y, the wireless power transmitter may enter the power saving mode again in operation S719. For example, the wireless power transmitter may apply second power 851 and 852 and third power 861 to 865 of FIG. 8.

In the above description, the operation in a case where the error is generated while the wireless power transmitter transmits the charging power has been discussed. Hereinafter, an operation of the wireless power transmitter when a plurality of wireless power receivers receives charging power on the wireless power transmitter will be described.

Figure 9:
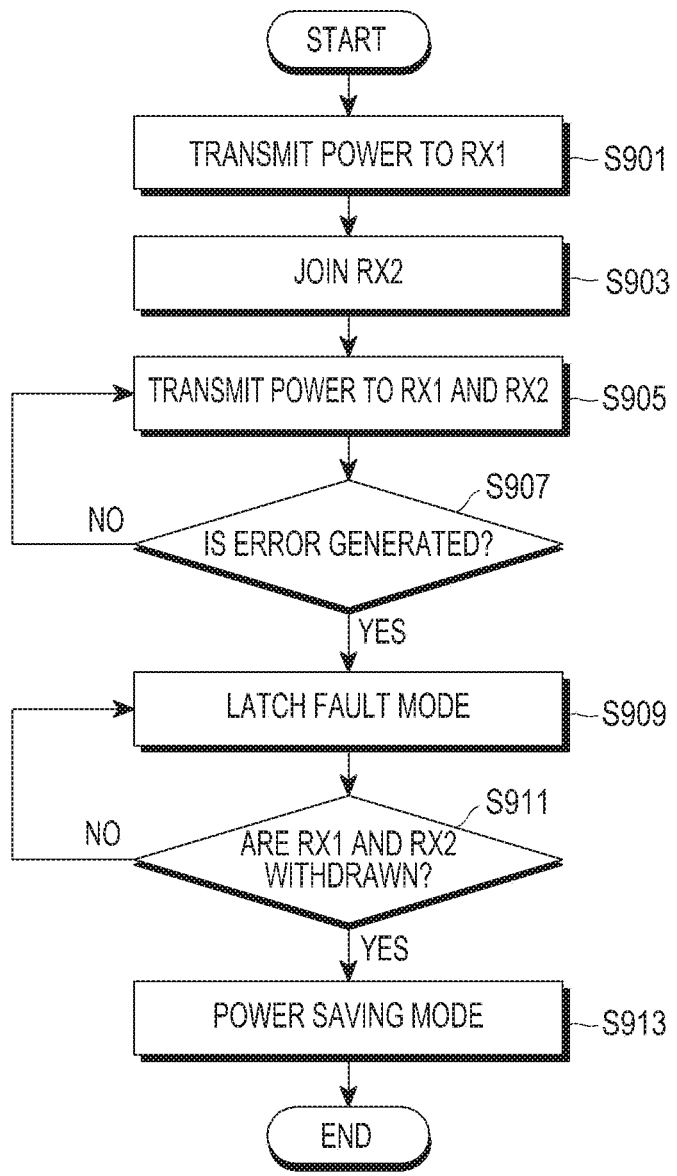
FIG. 9 is a flowchart for describing a control method of a wireless power transmitter according to an embodiment of the present disclosure.
Figure 10:
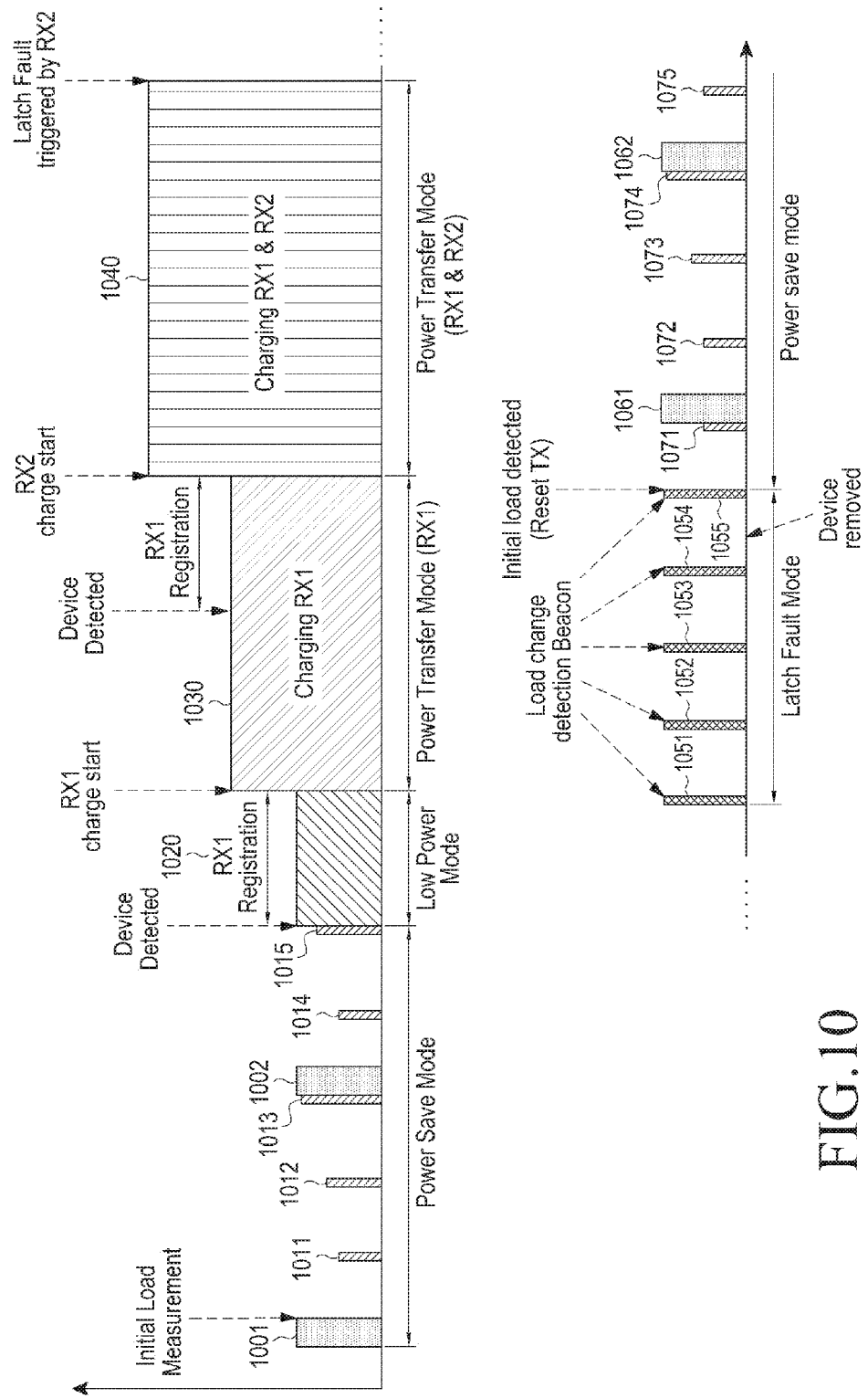
FIG. 10 is a graph on a time axis of an amount of power applied by a wireless power transmitter according to an embodiment of the present disclosure.

FIG. 9 is a flowchart for describing a control method of a wireless power transmitter according to an embodiment of the present disclosure. The control method of FIG. 9 will be described below with reference to FIG. 10. FIG. 10 is a graph on a time axis of an amount of power applied by a wireless power transmitter according to the embodiment of FIG. 9.

Referring to FIG. 9, the wireless power transmitter may transmit charging power to a first wireless power receiver in operation S901. Further, the wireless power transmitter may additionally enable the wireless power receiver to subscribe a wireless power network in operation S903. In addition, the wireless power transmitter may transmit charging power to the second wireless power receiver in operation S905. More specifically, the wireless power transmitter may apply a sum of the charging power required by the first wireless power receiver and the second wireless power receiver to the power receiver.

FIG. 10 is a graph on a time axis of an amount of power applied by a wireless power transmitter according to an embodiment of the present disclosure.

Referring to FIG. 10, for example, the wireless power transmitter may maintain the power saving mode in which second detection power 1001 and 1002 and third detection power 1011 to 1015 are applied. Thereafter, the wireless power transmitter may detect the first wireless power receiver and enter the low power mode in which detection power 1020 is maintained. Thereafter, the wireless power transmitter may enter the power transmission mode in which first charging power 1030 is applied. The wireless power transmitter may detect the second wireless power receiver and may enable the second wireless power receiver to subscribe to the wireless power network. Further, the wireless power transmitter may apply second charging power 1040 having a power amount corresponding to a sum of power amounts required by the first wireless power receiver and the second wireless power receiver.

Referring back to FIG. 9, the wireless power transmitter may detect an error generation in operation S907 while charging power is transmitted to both of the first and second wireless power receivers in operation S905. Here, the error may be a disposition of a rogue object, a cross-connection, an over voltage, an over current, an over temperature, and the like, as described above. When the error is not generated in operation S907-N, the wireless power transmitter may maintain the applying of the second charging power 1040.

Meanwhile, when the error is generated in operation S907-Y, the wireless power transmitter may enter the latch fault mode in operation S909. For example, the wireless power transmitter may apply the first power 1051, 1052, 1053, 1054, and 1055 of FIG. 10 by a first period. The wireless power transmitter may determine whether both of the first wireless power receiver and the second wireless power receiver are withdrawn in operation S911. For example, the wireless power transmitter may detect an impedance change during the applying of the first power 1051 to 1055. The wireless power transmitter may determine whether both of the first wireless power receiver and the second wireless power receiver are withdrawn based on whether the impedance is returned to an initial value.

When it is determined that both of the first wireless power receiver and the second wireless power receiver are withdrawn in operation S911-Y, the wireless power receiver may enter the power saving mode in operation S913. For example, the wireless power transmitter may apply second detection power 1061 and 1062 and third detection power 1071 to 1075 according to a second period and a third period, respectively, as shown in FIG. 10.

As described above, even if the wireless power transmitter applies charging power to a plurality of wireless power receivers, the wireless power transmitter may determine whether the wireless power receiver or the rogue object is easily withdrawn when the error occurs.

Figure 11:
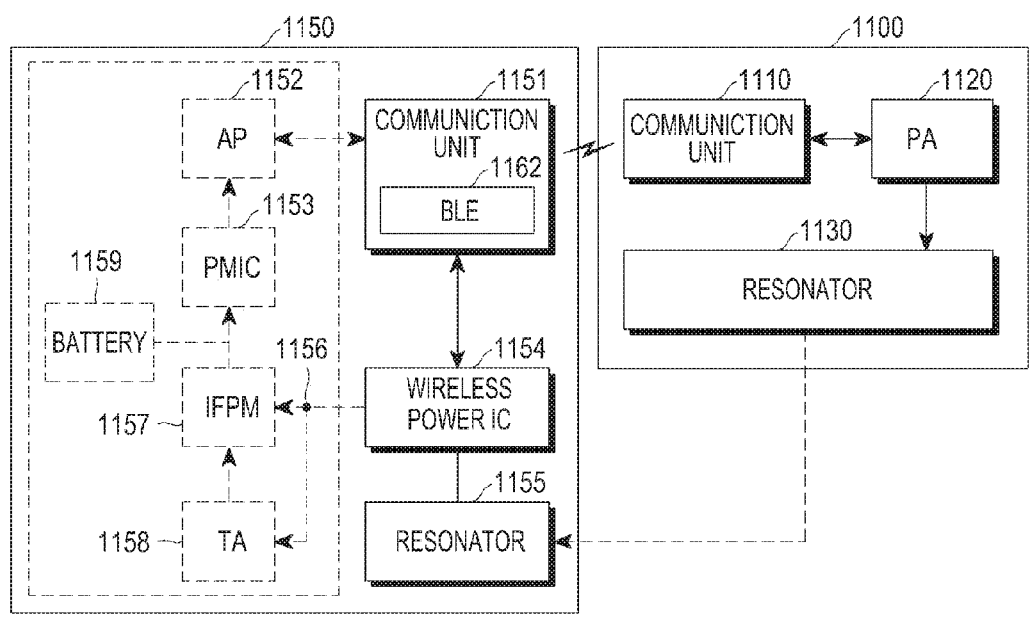
FIG. 11 is a block diagram of a wireless power transmitter and a wireless power receiver in a stand alone (SA) mode according to an embodiment of the present disclosure.

FIG. 11 is a block diagram of a wireless power transmitter and a wireless power receiver in an SA mode according to an embodiment of the present disclosure.

Referring to FIG. 11, a wireless power transmitter 1100 may include a communication unit 1110, a power amplifier (PA) 1120, and a resonator 1130. A wireless power receiver 1150 may include a communication unit (WPT Communication IC) 1151, an application processor (AP) 1152, a power management integrated circuit (PMIC) 1153, a wireless power integrated circuit (WPIC) 1154, a resonator 1155, an interface power management (IFPM) IC 1157, a travel adapter (TA) 1158, and a battery 1159.

The communication unit 1110 may be implemented by WiFi/BT Combo IC and communicate with the communication unit 1151 in a certain scheme, for example, a BLE scheme. For example, the communication unit 1151 of the wireless power transmitter 1150 may transmit the PRU dynamic signal having the data configuration of Table 1 to the communication unit of the wireless power transmitter 1100. As described above, the PRU dynamic signal may include at least one of voltage information, current information, temperature information and alert information of the wireless power receiver 1150.

A value of the power output from the power amplifier 1120 may be adjusted based on the received PRU dynamic signal. For example, when the over voltage, the over current, and the over temperature are applied to the wireless power receiver 1150, a power value output from the power amplifier 1120 may be reduced. Further, when a voltage or current of the wireless power receiver 1150 is smaller than a preset value, a power value output from the power amplifier 1120 may be increased.

Charging power from the resonator 1130 may be wirelessly transmitted to the resonator 1155.

The wireless power integrated circuit 1154 may rectify and DC-DC convert the charging power received from the resonator 1155. The WPIC 1154 uses the converted power to operate the communication unit 1151 or to charge the battery 1159.

Meanwhile, a wired charging terminal may be inserted in the TA 1158. The travel adapter 1158 may have the wired charging terminal, such as a 30 pin connector or universal serial bus (USB) connector, which is inserted in the travel adapter 1158, and may receive the power supplied from an external power source to charge the battery 1159.

The IFPM 1157 may process power applied from the wired charging terminal and output the processed power to the battery 1159 and the PMIC 1153.

The PMIC 1153 may manage power received wired or wirelessly and power received by each component of the wireless power receiver 1150. The AP 1152 may receive information on the power from the PMIC 1153, and may control the communication unit 1151 to transmit the PRU dynamic signal of reporting the power information.

The travel adapter 1158 may be connected to a node 1156 connected to the WPIC 1154. When the wired charging connector is inserted in the travel adaptor 1158, a preset voltage, for example 5 V, may be applied to the node 1156. The WPIC 1154 may monitor the voltage applied to the node 1156 to determine whether the travel adapter is inserted.

Meanwhile, the AP 1152 has a stack in a certain communication scheme, for example, a WiFi/BT/BLE stack. Accordingly, during communication for the wireless charging, the communication unit 1151 may load the stack from the AP 1152 and then communicate with the communication unit 1110 of the wireless power transmitter 1100 by using a BT or BLE communication scheme based on the stack.

However, a state may occur in which data for performing wireless power transmission cannot be fetched from the AP 1152 since the AP 1152 is turned off or in which power is lost so that the AP 1152 cannot remain in an on state while the data is fetched from a memory within the AP 1152 to be used.

As described above, the remaining capacity of the battery 1159 is lower than a minimum power threshold, the AP 1152 is turned off, and thus the wireless charging may be performed by using some components, for example, the communication unit 1151, the WPIC 1154, the resonator 1155, and the like, for the wireless charging, which are in the wireless power receiver. A state where the AP 1152 cannot be turned on may be referred to as a dead battery state.

Since the AP 1152 is not driven in the dead battery state, the communication unit 1151 cannot receive a stack in a certain communication scheme, for example, a WiFi/BT/BLE stack from the AP 1152. For such a case, some of the stacks of the certain communication scheme, for example, the BLE stack, may be fetched and stored in the memory 1162 of the communication unit 1151 from the AP 1152. Accordingly, the communication unit 1151 may communicate with the wireless power transmitter 1100 for the wireless charging by using the stack of the communication scheme stored in the memory 1162, that is, a wireless charging protocol. At this time, the communication unit 1151 may include a memory therein, and the BLE stack may be stored in a memory in the form of a ROM in the SA mode.

As described above, a mode in which the communication unit 1151 performs the communication by using the stack of the communication scheme stored in the memory 1162 may be referred to as the SA mode. Accordingly, the communication unit 1151 may manage a charging process based on the BLE stack.

In the above, the concept of the wireless charging system which may be applied to an embodiment of the present disclosure is described with reference to FIGS. 1 to 11. Hereinafter, a wireless power transmitter according to an embodiment of the present disclosure is described below with reference to FIGS. 12 to 17.

Figure 12:
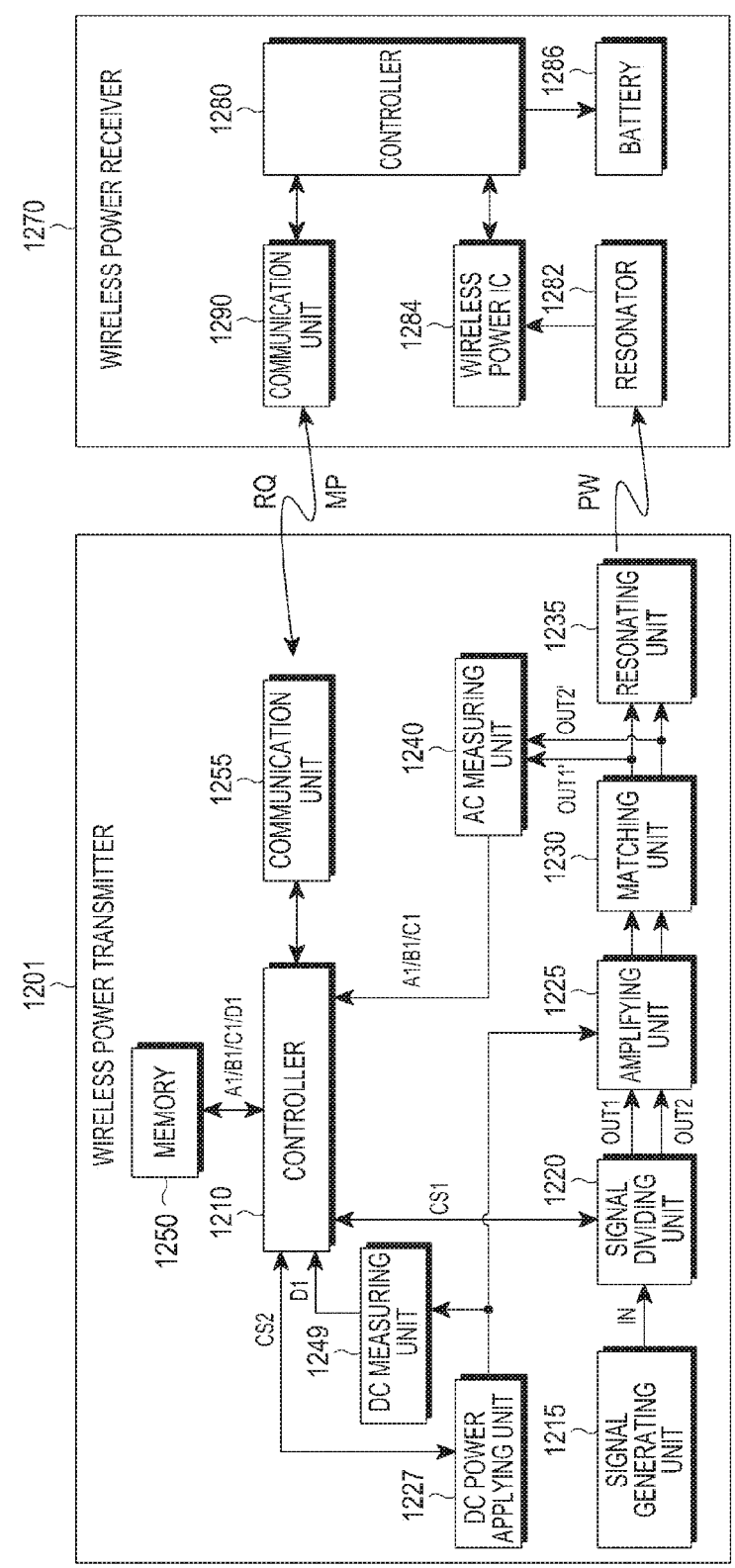
FIG. 12 is a schematic block diagram of a wireless power system according to various embodiments of the present disclosure.

FIG. 12 is a schematic block diagram of a wireless power system according to various embodiments of the present disclosure.

Referring to FIG. 12, a wireless power system 1200 may include a wireless power transmitter 1201 and a wireless power receiver 1270.

The wireless power system 1200 is a system in which the wireless power receiver 1270 may perform a wireless charging using wireless power PW output from the wireless power transmitter 1201.

The wireless power transmitter 1201 may be substantially the same as or similar to the wireless power transmitter described with reference to FIGS. 1 to 11.

The wireless power transmitter 1201 may transmit the wireless power PW to the wireless power receiver 1270 using a differential signal. In addition, the wireless power transmitter 1201 may transmit information on the wireless power PW to the wireless power receiver 1270 or may receive the information on the wireless power PW from the wireless power receiver 1270.

The wireless power transmitter 1201 may include a controller 1210, a signal generating unit 1215, a signal dividing unit 1220, a amplifying unit 1225, a DC power applying unit 1227, a matching unit 1230, a resonating unit 1235, an AC measuring unit 1240, a DC measuring unit 1249, a memory 1250, and a communication unit 1255.

The controller 1210 may control overall operations of the wireless power transmitter 1201.

The controller 1210 may include at least one of a CPU, an AP and a communication processor (CP). For example, the controller 1210 may control at least one of other components and/or execute an operation or a data process related to communication of at least one of other components.

The controller 1210 may control a differential signal OUT1, OUT2, OUT1' and/or OUT2' for the wireless power PW. For example, the controller 1210 may control at least one of an amplitude and a phase of the differential signal OUT1, OUT2, OUT1' and/or OUT2' for the wireless power PW.

According to an embodiment of the present disclosure, the controller 1210 may transmit a first control signal CS1 to the signal dividing unit 1220 to control first differential signals OUT1 and OUT2 output from the signal dividing unit 1220. In addition, the controller 1210 may transmit a second control signal CS2 to the DC power applying unit 1227 to control the DC power output from the DC power applying unit 1227.

The first control signal CS1 may indicate a signal for controlling the first differential signals OUT1 and OUT2 output from the signal dividing unit 1220. In addition, the first control signal CS may indicate a signal for controlling the first differential signals OUT1 and OUT2.

The second control signal CS2 may indicate a signal for controlling the DC power output from the DC power applying unit 1227. In addition, the second control signal CS2 may indicate a signal for controlling an on/off of the DC power applying unit 1227.

The controller 1210 may store information on second differential signals OUT1' and OUT2' in the memory 1250. At this time, the information on the second differential signals OUT1' and OUT2' may include a voltage value, a current value, a phase difference value, an amplitude of the second differential signals OUT1' and OUT2', a DC voltage value and/or a DC current value for amplifying the first differential signals OUT1 and OUT2.

According to an embodiment of the present disclosure, the controller 1210 may configure information on the second differential signals OUT1' and OUT2' as an initial reference value of the signal dividing unit 1220.

The signal generating unit 1215 may generate a signal IN for the wireless power. In addition, the signal generating unit 1215 may transmit the signal IN for the wireless power to the signal dividing unit 1220.

At this time, the signal IN for the wireless power may be a signal for transmitting the wireless power PW to the wireless power receiver 1270. In addition, the signal IN for the wireless power may indicate a signal input to the signal dividing unit 1220 such that the signal dividing unit 1220 may output a differential signal. According to an embodiment of the present disclosure, the signal IN for the wireless power may be implemented with a pulse width modulation (PWM) signal. At this time, the signal generating unit 1215 may be implemented with a PWM signal generator.

The signal dividing unit 1220 may receive the signal IN for the wireless power and may output the first differential signals OUT1 and OUT2. The first differential signals OUT1 and OUT2 may indicate the differential signals output from the signal dividing unit 1220.

According to an embodiment of the present disclosure, the signal dividing unit 1220 may be implemented with a differential amplifier (e.g., an OP-AMP). At this time, the signal IN for the wireless power may be input to the signal dividing unit 1220 in a signal-end signal.

The signal dividing unit 1220 may output the first differential signals OUT1 and OUT2 according to a control initial value. At this time, the control initial value is a value identified by a manufacturer of the wireless power transmitter 1201 experimentally. The control initial value may be configured such that two signals included in the first differential signals OUT1 and OUT2 have the same amplitudes and a phase difference of 180 degrees.

The signal dividing unit 1220 may output the first differential signals OUT1 and OUT2 in response to the control signal CS1 received from the controller 1210. For example, the signal dividing unit 1220 may output the first differential signals OUT1 and OUT2 according to the control of the controller 1210.

According to an embodiment of the present disclosure, the signal dividing unit 1220 may output the first differential signals OUT1 and OUT2 according to an initial reference value. At this time, the initial reference value is a value configured by the controller 1210 in an operation of initializing the wireless power transmitter. The initial reference value may be configured such that the output first differential signals OUT1 and OUT2 (or the output second differential signals OUT1' and OUT2') has the same (or similar) amplitudes and a phase difference of 180 degrees (or a value close to 180 degrees).

According to an embodiment of the present disclosure, the signal dividing unit 1220 may control the first differential signals OUT1 and OUT2 according to the control of the controller 1210 and may output the controlled first differential signals OUT1 and OUT2.

The signal dividing unit 1220 may output the first differential signals OUT1 and OUT2 to the amplifying unit 1225.

The amplifying unit 1225 may amplify the first differential signals OUT1 and OUT2 in response to the DC power received from the DC power applying unit 1227. For example, the amplifying unit 1225 may amplify the first differential signals OUT1 and OUT2 using a DC voltage (or a DC current) output from the DC applying unit 1227.

According to an embodiment of the present disclosure, the amplifying unit 1225 may be implemented with a CLASS-D amplifier or a CLASS-E amplifier.

The amplifying unit 1225 may transmit the amplified differential signal to the matching unit 1230.

The DC power applying unit 1227 may output the DC power (or DC voltage) for amplifying the first differential signals OUT1 and OUT2 output from the signal dividing unit 1220 to the amplifying unit 1225.

The DC power applying unit 1227 may output the DC power in response to the second control signal CS2 output from the controller 1210. For example, the DC power applying unit 1227 may output the DC power under the control of the controller 1210.

The matching unit 1230 may perform an impedance matching of the amplified differential signal. For example, the matching unit 1230 may adjust an impedance of the wireless charging receiver 1270 from the matching unit 1230 to perform the impedance matching of the amplified differential signal.

The resonating unit 1235 may resonate power corresponding to the second differential signals OUT1' and OUT2' output from the matching unit 1230. In addition, the resonating unit 1235 may resonate power corresponding to the second differential signals OUT1' and OUT2' output from the matching unit 1230 to transmit the wireless power PW corresponding to the second differential signals OUT1' and OUT2' to the wireless charging receiver 1270.

The second differential signal OUT1' and OUT2' may indicate a differential signal applied to the resonating unit 1235.

The wireless power PW may indicate alternating power corresponding to the second differential signals OUT1' and OUT2' input to the resonating unit 1235 of the wireless power transmitter 1201.

The AC measuring unit 1240 may measure the second differential signals OUT1' and OUT2' applied to the resonating unit 1235 and may transmit a measurement result A1, B1 and/or C1 to the controller 1210.

The AC measuring unit 1240 may measure a voltage and a current of a positive differential signal OUT1' in the second differential signals OUT1' and OUT2', and may measure a voltage and a current of a negative differential signal OUT2' in the second differential signals OUT1' and OUT2'. In addition, the AC measuring unit 1240 may measure a phase difference of the positive differential signal OUT1' and the negative differential signal OUT2'.

At this time, the positive differential signal OUT1' and the negative differential signal OUT2' are for distinguishing two signals in the second differential signals OUT1' and OUT2' for convenience of description.

The DC measuring unit 1249 may measure DC power (or DC voltage) output from the DC power applying unit 1227. For example, the DC measuring unit 1249 may measure the DC power (or DC voltage) amplifying the first differential signals OUT1 and OUT2.

The DC measuring unit 1249 may transmit the measured DC power D1 to the controller 1210. At this time, the measured DC power D1 may indicate DC power value (or DC voltage value) amplifying the first differential signals OUT1 and OUT2.

The memory 1250 may store the information A1, B1, C1 and/or D1 for the second differential signals OUT1' and OUT2' transmitted from the controller 1210. According to an embodiment of the present disclosure, the memory 1250 may store the initial reference value of the signal dividing unit 1220. At this time, the memory 1250 may be implemented with a volatile and/or nonvolatile memory.

The communication unit 1255 may wirelessly transmit and receive data (or information) for the wireless power PW to and from the wireless power receiver 1270.

According to an embodiment of the present disclosure, the communication unit 1255 may transmit a request signal RQ requesting measured reception power to the wireless power receiver 1270. In addition, the communication unit 1255 may receive the measured reception power (MP) from the wireless power receiver 1270.

For convenience of description, the AC measuring unit 1240 and the DC measuring unit 1249 are separated, but the AC measuring unit 1240 and the DC measuring unit 1249 may be included in the controller 1210.

Meanwhile, the wireless power transmitter 1201 may further include a sensor unit (not shown). At this time, the sensor unit (not shown) may detect a surrounding temperature of the wireless power transmitter 1201, and may transmit the detected temperature value to the controller 1210. At this time, the controller 1210 may configure the detected temperature value as the initial reference value of the signal dividing unit 1220.

The wireless power receiver 1270 may receive the wireless power PW output from the wireless power transmitter 1201 and may perform a wireless charging using the wireless power PW. In addition, the wireless power receiver 1270 may transmit or receive information on the wireless power PW to the wireless power transmitter 1201 or from the wireless power transmitter 1201.

The wireless power receiver 1270 may include a controller 1280, a resonating unit 1282, a wireless power integrated circuit (WPIC) 1284, a battery unit 1286, and a communication unit 1290.

The controller 1280 may control overall operations of the wireless power receiver 1270.

The resonating unit 1282 may wirelessly receive the wireless power PW transmitted from the resonating unit 1235. For example, the resonating unit 1282 may wirelessly receive an alternating current corresponding to the second differential signals OUT1' and OUT2'.

The WPIC 1284 may convert the wireless power (e.g., alternating current power) received from the resonating unit 1282 into DC power. The WPIC 1284 may drive the communication unit 1151 using the converted power, or may transmit the converted power to the battery unit 1286.

The battery unit 1286 may charge power by using the converted power.

The communication unit 1290 may wirelessly transmit or receive data related to the wireless power. According to an embodiment of the present disclosure, the communication unit 1290 may transmit the measured reception power MP to the wireless power transmitter 1201 in response to the request of the wireless power transmitter 1270.

Figure 13:
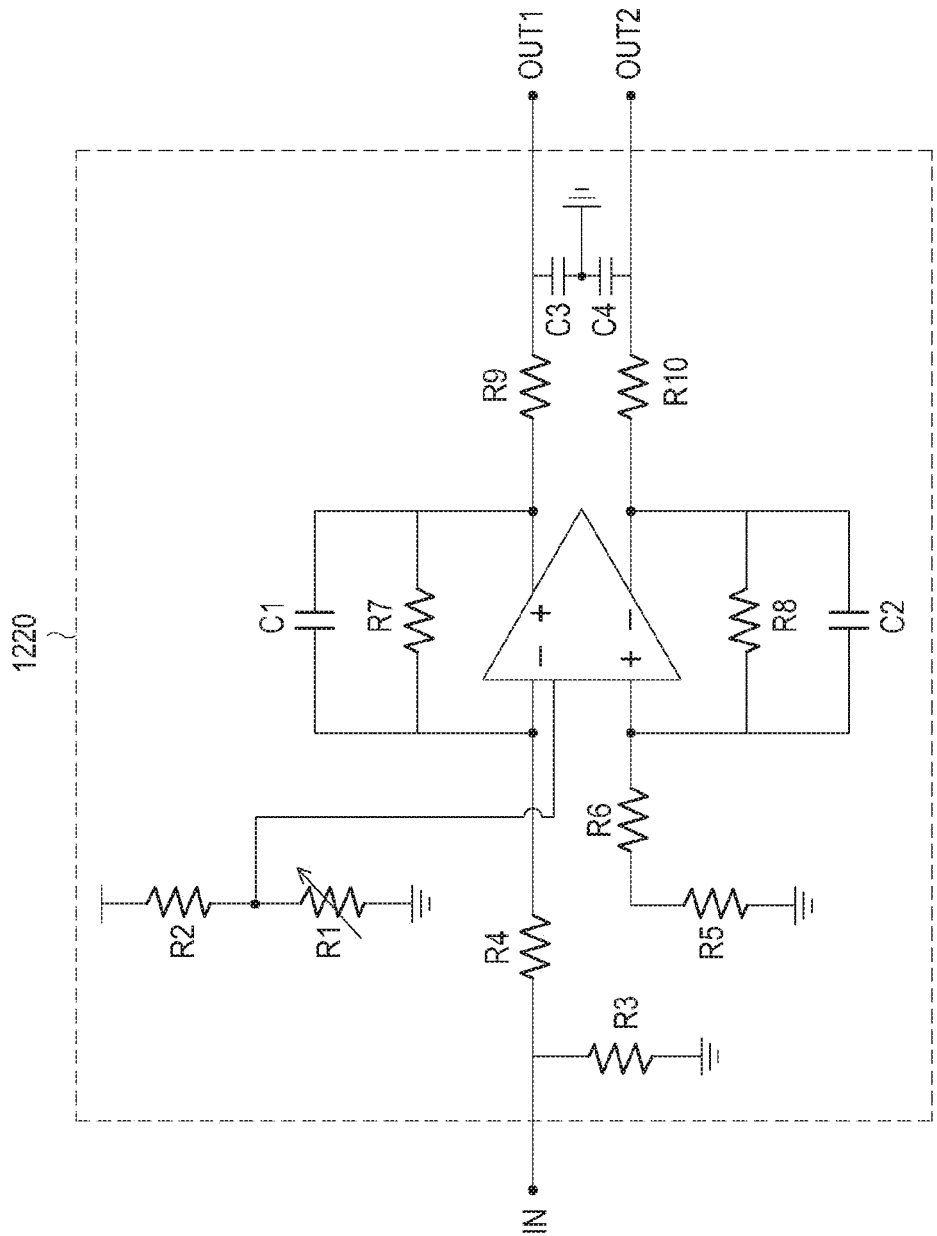
FIG. 13 is a specific circuit diagram for a signal dividing unit according to an embodiment of the present disclosure.

FIG. 13 is a specific circuit diagram for the signal dividing unit according to an embodiment of the present disclosure.

Referring to FIGS. 12 and 13, a signal dividing unit 1220 may be implemented with a differential amplifier (e.g., a differential OP-AMP).

The signal dividing unit 1220 may receive the signal IN for the wireless power generated from the signal generating unit 1215 through an input end. At this time, the signal dividing unit 1220 may receive the signal IN for the wireless power in a single-end signal. In addition, the signal dividing unit 1220 may be connected to dummy loads R5 and R6 through another input end.

The signal dividing unit 1220 may output the first differential signals OUT1 and OUT2. At this time, two signals in the differential signals may be implemented such that the two signals have the same amplitude and a phase difference of 180 degrees. At this time, the amplitudes and the phase difference of the differential signals may be controlled while changing a duty rate of a signal (e.g., the DC power) applied to the amplifying unit 1225 by an output common mode voltage (OCMV).

The OCMV may be subordinated to a voltage determined by a resistance division law. At this time, a resistor R1 used in a resistance division may be implemented with a variable resistor which is variable by a digital control (e.g., a PWM). In addition, the dummy loads R5 and R6 may be implemented with a variable resistor which is variable in a digital control.

For example, the signal dividing unit 1220 may output the first differential signals OUT1 and OUT2 by controlling the resistor R1 and/or dummy loads R5 and R6.

Figure 14:
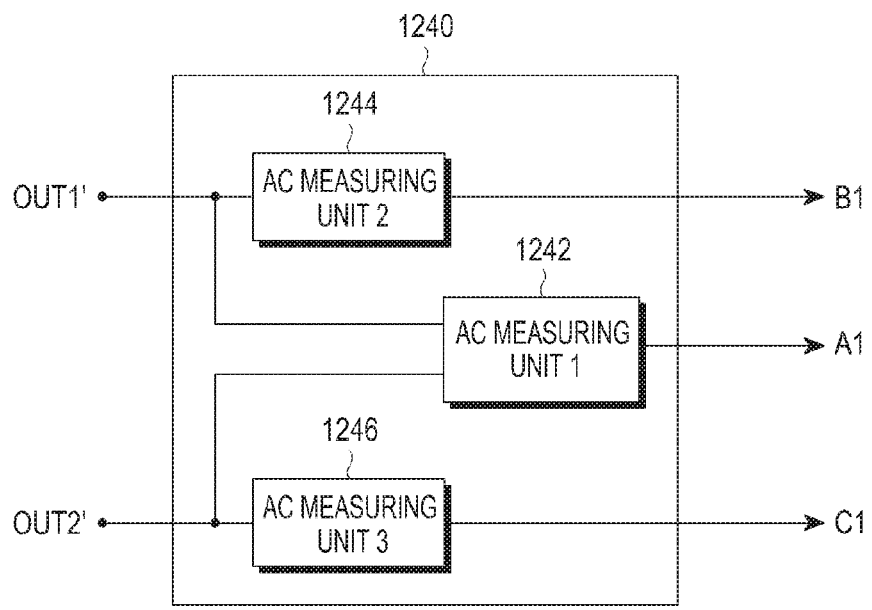
FIG. 14 is a schematic block diagram for an AC measuring unit according to an embodiment of the present disclosure.

FIG. 14 is a schematic block diagram for the AC measuring unit according to an embodiment of the present disclosure.

Referring to FIGS. 12 and 14, an AC measuring unit 1240 may measure the second differential signals OUT1' and OUT2' applied to the resonating unit 1235, and may transmit a measurement result A1, B1 and C1 to the controller 1210.

The AC measuring unit 1240 may include a first AC measuring unit 1242, a second AC measuring unit 1244, and a third AC measuring unit 1246.

The first AC measuring unit 1242 may measure a signal obtained by adding two signals in the second differential signals OUT1' and OUT2'.

According to an embodiment of the present disclosure, the first AC measuring unit 1242 may measure a phase difference of the second differential signals OUT1' and OUT2'. For example, when the second differential signals OUT1' and OUT2' have the same amplitude and a phase difference of 180 degrees, the first AC measuring unit 1242 may measure a voltage value which is double of an offset voltage in a DC form. In addition, when the second differential signals OUT1' and OUT2' do not have the same amplitude and a phase difference of 180 degrees, the first AC measuring unit 1242 may measure a voltage value which is different from a double of the offset voltage in an AC form.

The first AC measuring unit 1242 may transmit a first measurement result A1 for the two signals in the second differential signals OUT1' and OUT2' to the controller 1210. Meanwhile, the first measurement result A1 may include a result indicating whether the two signals have a phase difference.

The second AC measuring unit 1244 may measure a positive differential signal OUT1' of the two signals in the second differential signals OUT1' and OUT2'. According to an embodiment of the present disclosure, the second AC measuring unit 1244 may measure a voltage and a current of the positive differential signal OUT1'.

The second AC measuring unit 1244 may measure the voltage value and the current value of the positive differential signal OUT1', and may transmit a second measurement result B1 to the controller 1210.

The third AC measuring unit 1246 may measure a negative differential signal OUT2' of the two signals in the second differential signals OUT1' and OUT2'. According to an embodiment of the present disclosure, the third AC measuring unit 1246 may measure a voltage and a current of the negative differential signal OUT2'.

The third AC measuring unit 1246 may measure the voltage value and the current value of the negative differential signal OUT2', and may transmit a third measurement result C1 to the controller 1210.

The controller 1210 may determine a phase difference value of the second differential signals OUT1' and OUT2' based on the first measurement result A1. In addition, the controller 1210 may determine the voltage value and the current value of the positive differential signal OUT1' based on the second measurement result B1, and may determine the voltage value and the current value of the negative differential signal OUT2' based on the third measurement result C1.

At this time, the controller 1210 may determine an amplitude difference between the second differential signals OUT1' and OUT2' based on the second measurement result B1 and the third measurement result C1. For example, the controller 1210 may determine the amplitude difference between the second differential signals OUT1' and OUT2' based on a difference between the second measurement result B1 and the third measurement result C1.

Figure 15:
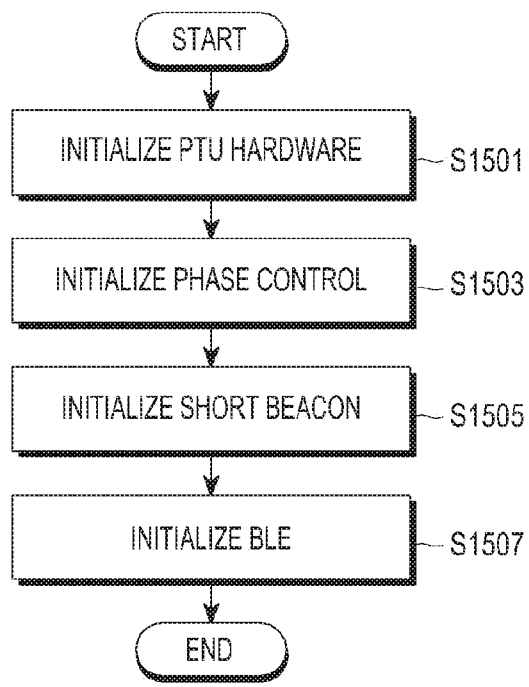
FIG. 15 is a flowchart for describing an initialization configuration of a wireless power transmitter according to an embodiment of the present disclosure.

FIG. 15 is a flowchart for describing an initialization configuration of a wireless power transmitter according to an embodiment of the present disclosure.

Referring to FIGS. 1 to 15, the wireless power transmitter 1201 may perform an initialization configuration.

When power is applied to the wireless power transmitter 1201, the wireless power transmitter 1201 may perform the initialization configuration.

First, the wireless power transmitter 1201 may perform a hardware initialization in operation S1501. The hardware initialization may indicate an operation or a process for initializing components (or a hardware) of the wireless power transmitter 1201.

The wireless power transmitter 1201 may perform a phase control initialization in operation S1503. The phase control initialization may indicate an operation or a process for initializing a phase (or an amplitude) of the differential signal generated from the signal dividing unit 1220. For example, information on a phase control of the signal dividing unit 1220 may be configured as a control initial value or an initial reference value.

At this time, the wireless power transmitter 1201 may perform an initialization of the signal dividing unit 1220. For example, the wireless power transmitter 1201 may configure the initial reference value of the signal dividing unit 1220.

According to an embodiment of the present disclosure, the wireless power transmitter 1201 may measure the second differential signals OUT1' and OUT2', and may configure the measurement result A1, B1 and C1 as the initial reference value of the signal dividing unit 1220. Additionally, the wireless power transmitter 1201 may measure DC power (e.g., DC voltage and DC current) for amplifying the first differential signals OUT1 and OUT2, and may configure the measurement result D1 as the initial reference value of the signal dividing unit 1220.

The wireless power transmitter 1201 may perform an initialization of a detection power beacon (e.g., a short beacon) in operation S1505. In addition, the wireless power transmitter 1201 may perform an initialization of a detection power beacon (e.g., a long beacon).

The wireless power transmitter 1201 may perform an initialization of a bidirectional communication (e.g., BLE) in operation S1507. In addition, the wireless power transmitter 1201 may perform an initialization of another bidirectional communication (e.g., WiFi, Zigbee and BT). For example, the wireless power transmitter 1201 may initialize the bidirectional communication in a frequency of 2.4 GHz.

The wireless power transmitter 1201 may perform an initialization operation through the initialization method. At this time, the initialization operation of the wireless power transmitter 1201 may be performed in an assumption that the wireless power receiver 1270 is located in a specific position. In addition, the initialization operation of the wireless power transmitter 1201 may be performed in an assumption that the wireless power receiver 1270 is not located in a charging area of the wireless power transmitter 1201.

Meanwhile, the wireless power transmitter 1201 may configure an effective range of the initial reference value. For example, when an initial reference value configured based on a measurement result A1, B1, C1 and/or D1 is out of the effective range, the wireless power transmitter 1201 may determine an abnormal state (i.e., a local fault), and may not configure the measurement result A1, B1, C1 and/or D1 as the initial reference value. At this time, the wireless power transmitter 1201 may notify a signal indicating the abnormal state (i.e., a local fault).

Figure 16:
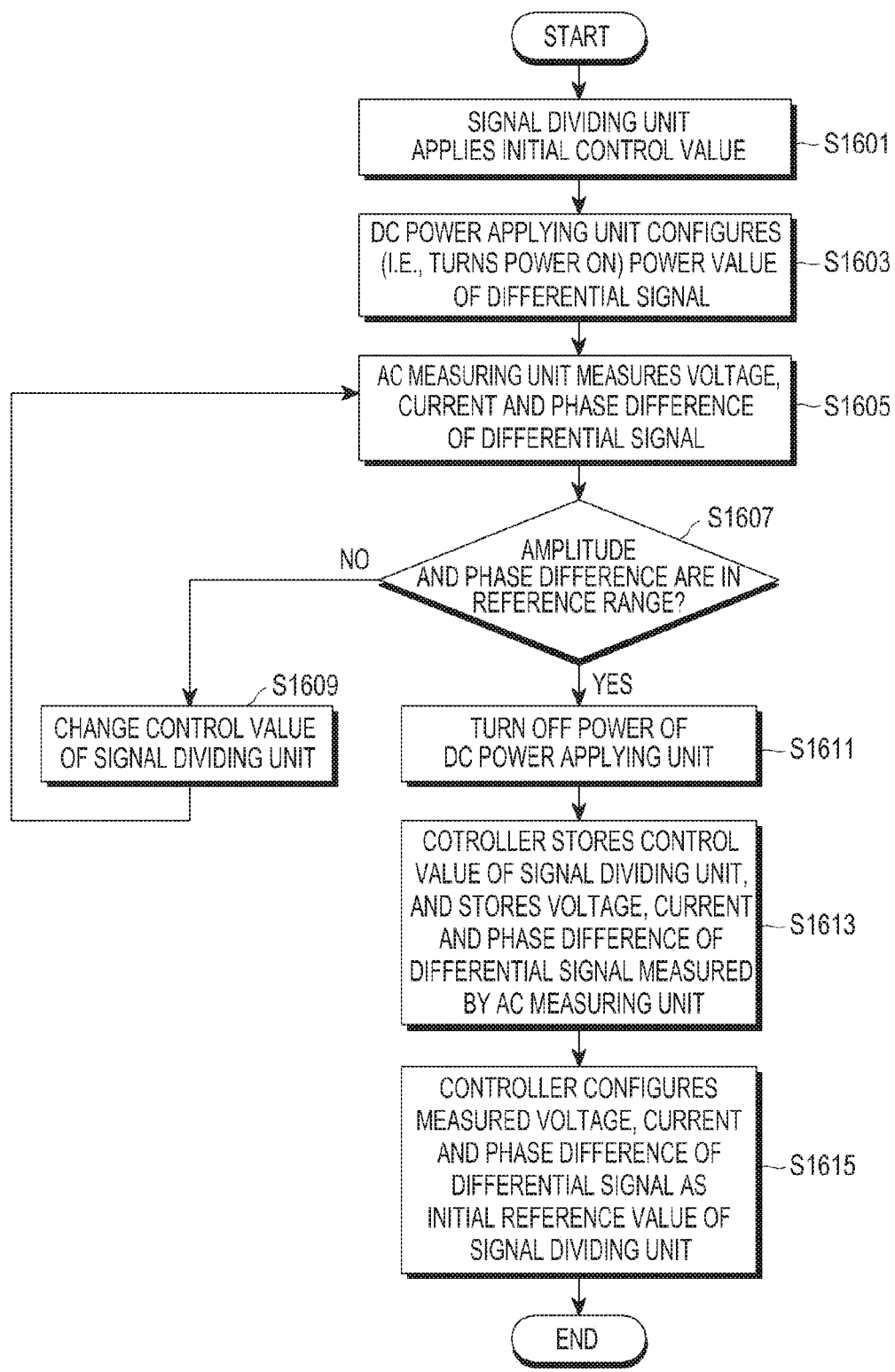
FIG. 16 is a flowchart for describing an initialization operation of a signal dividing unit according to an embodiment of the present disclosure.

FIG. 16 is a flowchart for describing an initialization operation of a signal dividing unit according to an embodiment of the present disclosure.

Referring to FIGS. 12 to 16, the initialization of the signal dividing unit may be performed in an initialization configuration (e.g., the phase control initialization in operation S1503) of the wireless power transmitter 1201.

The signal dividing unit 1220 may apply a control initial value, and may output the first differential signals OUT1 and OUT2 based on the control initial value in operation S1601.

The DC power applying unit 1227 may configure a DC power value for amplifying the first differential signals OUT1 and OUT2 in operation S1603. At this time, the DC power applying unit 1227 may be in a power on state according to the control of the controller 1210.

The first differential signals OUT1 and OUT2 may be amplified by the amplifying unit 1225 due to the DC power value configured by the DC power applying unit 1227. In addition, the impedance matching of the amplified differential signals may be performed by the matching unit 1230, and the amplified differential signals may be applied to the resonating unit 1235.

The AC measuring unit 1240 may measure the second differential signals OUT1' and OUT2' applied to the resonating unit 1235. According to an embodiment of the present disclosure, the AC measuring unit 1240 may measure voltages, currents and a phase difference of the second differential signals OUT1' and OUT2' applied to the resonating unit 1235 in operation S1605.

The AC measuring unit 1240 may transmit the measurement result A1, B1 and/or C1 to the controller 1210.

The controller 1210 may determine whether the amplitudes and the phase difference of the second differential signals OUT1' and OUT2' are in the reference range, based on the measurement result A1, B1 and/or C1 in operation S1607.

When the amplitudes and the phase difference of the second differential signals OUT1' and OUT2' are out of the reference range (no of operation S1607), the controller 1210 may transmit the first control signal CS1 to the signal dividing unit 1220 in operation S1609. At this time, the first control signal CS1 indicates a signal for controlling (or adjusting) the amplitude and the phase of the first differential signals OUT1 and OUT2 output from the signal dividing unit 1220.

The reference range may indicate a range in which two signals in the second differential signals OUT1' and OUT2' have the same amplitudes and a phase difference of 180 degrees. For example, the reference range may indicate a range in which the two signals in the second differential signals OUT1' and OUT2' have amplitudes and a phase difference enough to perform a wireless charging.

For example, if a reference range of the amplitude is 1 V, when an amplitude difference of the two signals in the second differential signals OUT1' and OUT2' is equal to or smaller than 1 V by varying the variable resistor R1, a variance of the variable resistor R1 may be stopped. At this time, the wireless power transmitter 1201 may transmit the wireless power using the second differential signals OUT1' and OUT2'.

The signal dividing unit 1220 may output the controlled differential signals according to the control of the controller 1210.

The AC measuring unit 1240 may measure the differential which corresponds to the controlled differential signal and applied to the resonating unit 1235.

When the amplitudes and the phase difference of the second differential signals OUT1' and OUT2' are in the reference range (yes of operation S1607), the controller 1210 may change power of the DC power applying unit to an off state in operation S1611.

The controller 1210 may store a control value of the first differential signals OUT1 and OUT2 output from the signal dividing unit 1220 in operation S1613. At this time, the control value may indicate a configuration value or a condition value such that the signal dividing unit 1220 outputs the first differential signals OUT1 and OUT2.

According to an embodiment of the present disclosure, the control value may indicate information on the amplitudes and the phases of the first differential signals OUT1 and OUT2. For example, the control value may indicate a resistance of a variable resistor of the signal dividing unit, which corresponds to the phases and the phases of the first differential signals OUT1 and OUT2.

The controller 1210 may store the measurement result A1, B1 and/or C1 received from the AC measuring unit 1240 in the memory 1250. In addition, the controller 1210 may store a DC voltage measurement result D1 received from the DC measuring unit 1249 in the memory 1250.

Meanwhile, the controller 1210 may configure the measurement result A1, B1 and/or C1 received from the AC measuring unit 1240 as the initial reference value of the signal dividing unit 1220 in operation S1615. Additionally, the controller 1210 may configure the DC voltage measurement result D1 as the initial reference value of the signal dividing unit 1220 together with the measurement result A1, B1 and/or C1.

Figure 17:
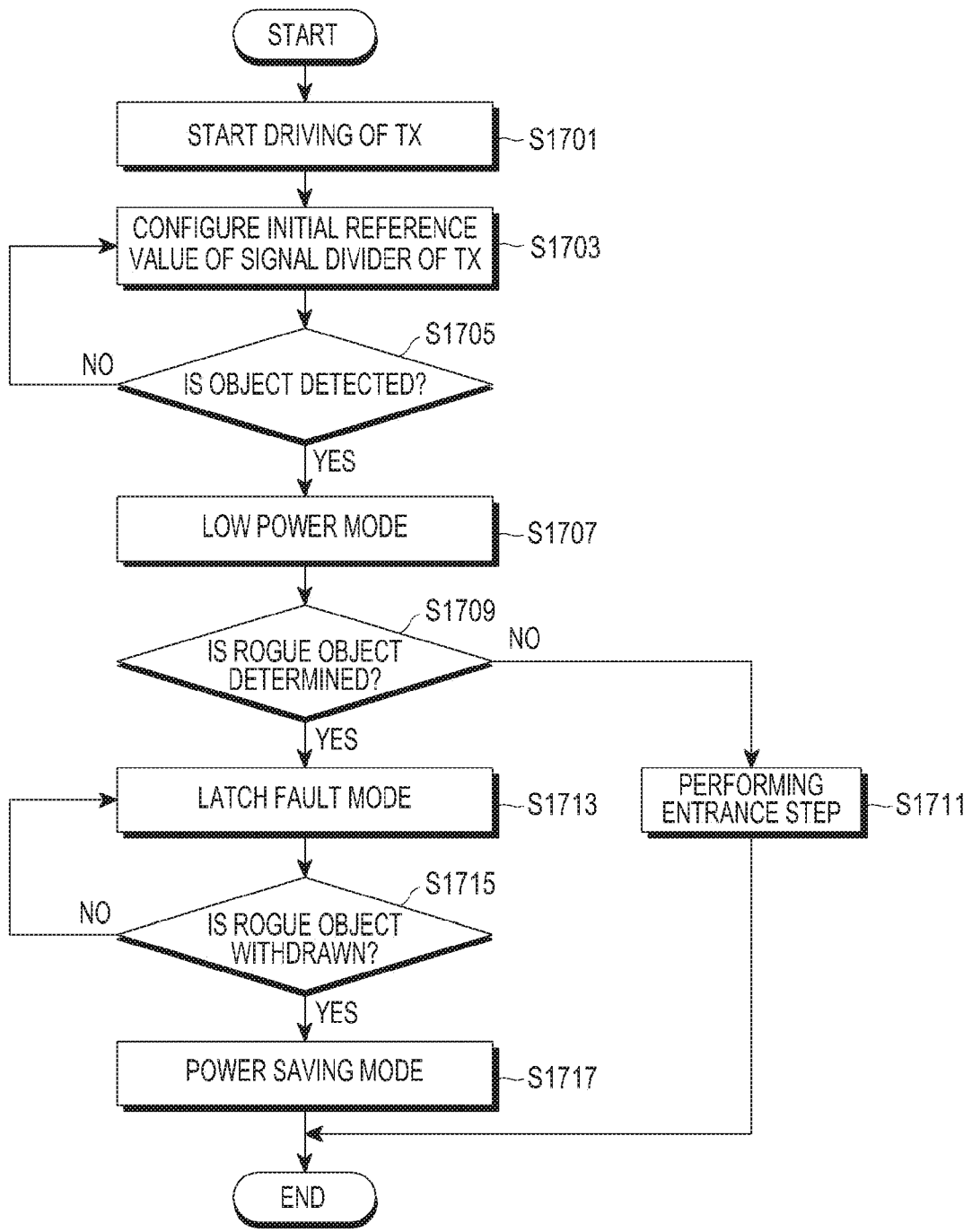
FIG. 17 is a flowchart for describing a method of controlling a wireless power transmitter according to various embodiments of the present disclosure.

FIG. 17 is a flowchart for describing a method of controlling a wireless power transmitter according to various embodiments of the present disclosure.

Referring to FIGS. 1 to 17, the wireless power transmitter 1201 may start a driving operation in operation S1701. In addition, the wireless power transmitter 1201 may reset an initial configuration.

The wireless power transmitter 1201 may configure an initial reference value of the signal dividing unit in operation S1703. A method of configuring the initial reference value may be implemented with the method described with reference to FIGS. 12 to 16.

The wireless power transmitter 1201 may enter a power saving mode. Here, the power saving mode may be an interval where the wireless power transmitter applies power having different amounts to the power transmitting unit. For example, the power saving mode may be an interval where the wireless power transmitter 1201 detects (or detects a load) the wireless power receiver 1270.

When the wireless power receiver 1270 is located on the wireless power transmitter 1201, an impedance from one point of the wireless power transmitter 1201 may be changed. For example, the wireless power transmitter 1201 may detect (or detect) the wireless power receiver 1270, based on the change of the impedance in operation S1705.

According to an embodiment of the present disclosure, the wireless power transmitter 1201 may determine the change of the impedance, and may detect the wireless power receiver 1270 in operation S1705. For example, the wireless power transmitter 1201 may compare the initial reference value with a measurement result for the second differential signals OUT1' and OUT2', which is measured by the AC measuring unit 1240, and may determine the impedance change according to a comparison result.

At this time, the wireless power transmitter 1201 may determine the impedance change using at least one of a current value of a positive differential signal, a voltage value of the positive differential signal, a current value of a negative differential signal, a voltage value of the negative differential signal, and a phase difference included in the initial reference value.

When an object is not detected (no of operation S1705), the wireless power transmitter 1201 may maintain the power saving mode where the wireless power transmitter 1201 periodically applies heterogeneous amounts of power.

When the impedance is changed and thus the object is detected (yes of operation S1705), the wireless power transmitter 1201 may enter the low power mode in operation S1707. Here, the low power mode is a mode where the wireless power transmitter 1201 applies driving power having an amount of power for driving the controller 1210 and/or the communication unit 1255 of the wireless power receiver 1270.

Thereafter, the wireless power transmitter 1201 may enter a power transmitting mode where the wireless power transmitter 1201 transmits the wireless power PW.

The wireless power transmitter 1201 may determine whether an error is generated in operation S1709. For example, the error may be a disposition of a rogue object on the wireless power transmitter, a cross-connection, an over voltage, an over current, an over temperature, and the like.

According to an embodiment of the present disclosure, the wireless power transmitter 1201 may measure the initial reference value, and the voltage, the current and/or the phase difference of the second differential signals OUT1' and OUT2', and may determine that an over voltage or over current condition is satisfied when the measured voltage, current, and/or phase difference is higher than a critical value.

When an error is not generated (no of operation S1709), the wireless power transmitter 1201 may maintain the power transmitting mode in operation S1711.

Meanwhile, when an error is generated (yes of operation S1709), the wireless power transmitter 1201 may enter the latch fault mode in operation S1713.

The wireless power transmitter 1201 may determine whether the rogue object or the wireless power receiver 1270 is withdrawn in operation S1715.

When the wireless power transmitter 1201 determines that the rogue object or the wireless power receiver 1270 is not withdrawn (no of operation S1715), the wireless power transmitter 1201 may maintain the latch fault mode.

Meanwhile, when the wireless power transmitter 1201 determines that the rogue object or the wireless power receiver 1270 is withdrawn (yes of operation S1715), the wireless power transmitter 1201 may enter the power saving mode again in operation S1717.

According to an embodiment of the present disclosure, the wireless power transmitter 1201 may release the latch fault mode based on the initial reference value in operation S1715. For example, the wireless power transmitter 1201 may determine whether the rogue object or the wireless power receiver 1270 is withdrawn based on the initial reference value in operation S1715. For example, the wireless power transmitter 1201 may compare the initial reference value with the measurement result of the second differential signals OUT1' and OUT2', which is measured by the AC measuring unit 1240, and may determine whether the rogue object or the wireless power receiver 1270 is withdrawn according to the comparison result.

At this time, the wireless power transmitter 1201 may determine whether the rogue object or the wireless power receiver 1270 is withdrawn using at least one of a current value of a positive differential signal, a voltage value of the positive differential signal, a current value of a negative differential signal, a voltage value of the negative differential signal, and a phase difference included in the initial reference value.

Meanwhile, the wireless power transmitter 1201 may determine the impedance change based on the initial reference value, and may initiate the wireless power transmitter 1201 according to a determination result.

According to an embodiment of the present disclosure, when the wireless power transmitter 1201 detects the impedance change and cannot communicate with the wireless power receiver 1270, the wireless power transmitter 1201 may determine an abnormal state (i.e., a local fault). At this time, the wireless power transmitter 1201 may turn power off for a certain time, and may perform an initialization.

Figure 18:
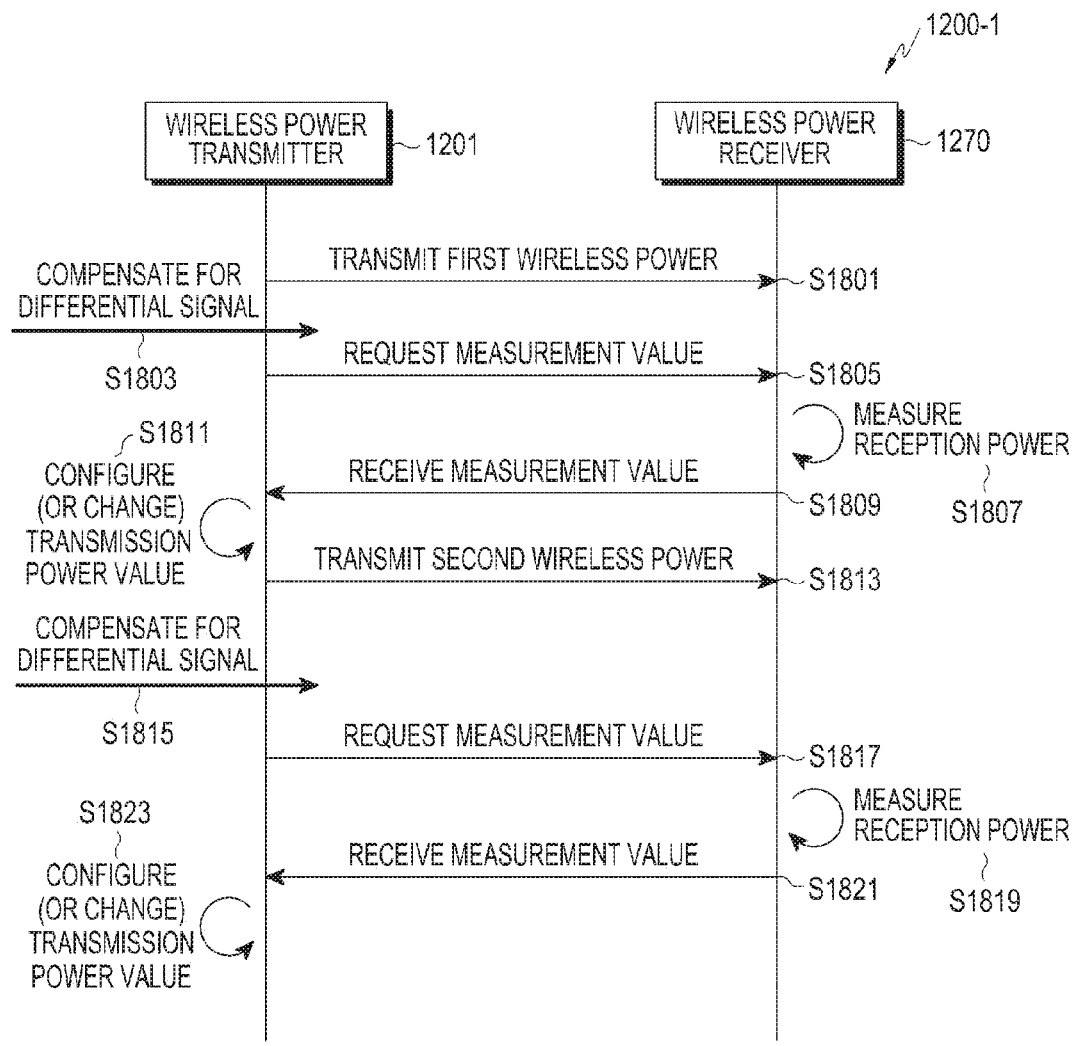
FIG. 18 is a data flow for describing a method of operating of a wireless power system according to various embodiments of the present disclosure.

FIG. 18 is a data flow for describing a method of operating of a wireless power system according to various embodiments of the present disclosure.

Referring to FIGS. 12 to 18, the wireless power system 1200-1 may be implemented substantially equal to or similar to the wireless power system described with reference to FIG. 12.

The wireless power system 1200-1 may perform a power tracking operation. For example, in the wireless power system 1200-1, the wireless power transmitter 1201 may transmit the wireless power to the wireless power receiver 1270, and the wireless power receiver 1270 may transmit information on the wireless power to the wireless power transmitter 1201.

The wireless power transmitter 1201 may configure the wireless power PW transmitting to the wireless power receiver 1270. At this time, the wireless power transmitter 1201 may periodically configure (or change) the wireless power PW.

The wireless power transmitter 1201 may transmit configured first wireless power PW to the wireless power receiver 1270 at operation S1801.

Meanwhile, the wireless power transmitter 1201 may control the second differential signals OUT1' and OUT2' for the first wireless power PW. At this time, the wireless power transmitter 1201 may control the second differential signals OUT1' and OUT2' from a time when the wireless power transmitter 1201 transmits the first wireless power PW to a time when the wireless power transmitter 1201 requests a measurement current to the wireless power receiver 1270 at operations S1801 to S1805. In addition, the wireless power transmitter 1201 may periodically control the second differential signals OUT1' and OUT2' from a time when the wireless power transmitter 1201 transmits the first wireless power PW to a time when the wireless power transmitter 1201 requests a measurement current to the wireless power receiver 1270.

Meanwhile, the AC measuring unit 1240 may periodically measure the second differential signals OUT1' and OUT2' such that the wireless power transmitter 1201 controls the second differential signals OUT1' and OUT2'.

The wireless power transmitter 1201 may transmit a request signal RQ for requesting measurement power for the first wireless power PW transmitted to the wireless power receiver 1270 at operation S1805.

The wireless power receiver 1270 may measure the received first wireless power PW according to the request signal RQ at operation S1807. At this time, the wireless power receiver 1270 may periodically measure the received first wireless power (PW).

The wireless power transmitter 1201 may receive measured wireless power MP from the wireless power receiver 1270 at operation S1809.

The wireless power transmitter 1201 may configure (or change) the first wireless power PW based on the received wireless power MP at operation S1811.

The wireless power transmitter 1201 may transmit the changed second wireless power PW to the wireless power receiver 1270 at operation S1813.

At this time, the wireless power transmitter 1201 may control the second differential signals OUT1' and OUT2' from a time when the wireless power transmitter 1201 transmits the second wireless power PW to a time when the wireless power transmitter 1201 requests the measurement current to the wireless power receiver 1270 at operation S1815.

For example, if a period when the wireless power transmitter 1201 changes the wireless power PW is 250 ms, the wireless power transmitter 1201 may control the second differential signals OUT1' and OUT2' during 50 ms after changing the first wireless power to the second wireless power.

In addition, the wireless power transmitter 1201 may control the second differential signals OUT1' and OUT2', based on the measurement power MP received from the wireless power receiver 1270.

The wireless power transmitter 1201 may the request signal RQ requesting the measurement power for the second wireless power PW transmitted to the wireless power receiver 1270 at operation S1817.

The wireless power receiver 1270 may measure the received second wireless power PW according to the request signal RQ at operation S1819.

The wireless power transmitter 1201 may receive the measured wireless power MP from the wireless power receiver 1270 at operation S1821.

The wireless power transmitter 1201 may configure (or change) the second wireless power PW based on the received wireless power PW at operation S1823.

For example, the control of the second differential signals OUT1' and OUT2' may be performed from a time when the wireless power transmitter 1201 transmits the wireless power or changes the wireless power to a time when the wireless power transmitter 1201 starts communication with the wireless power receiver 1270.

Figure 19:
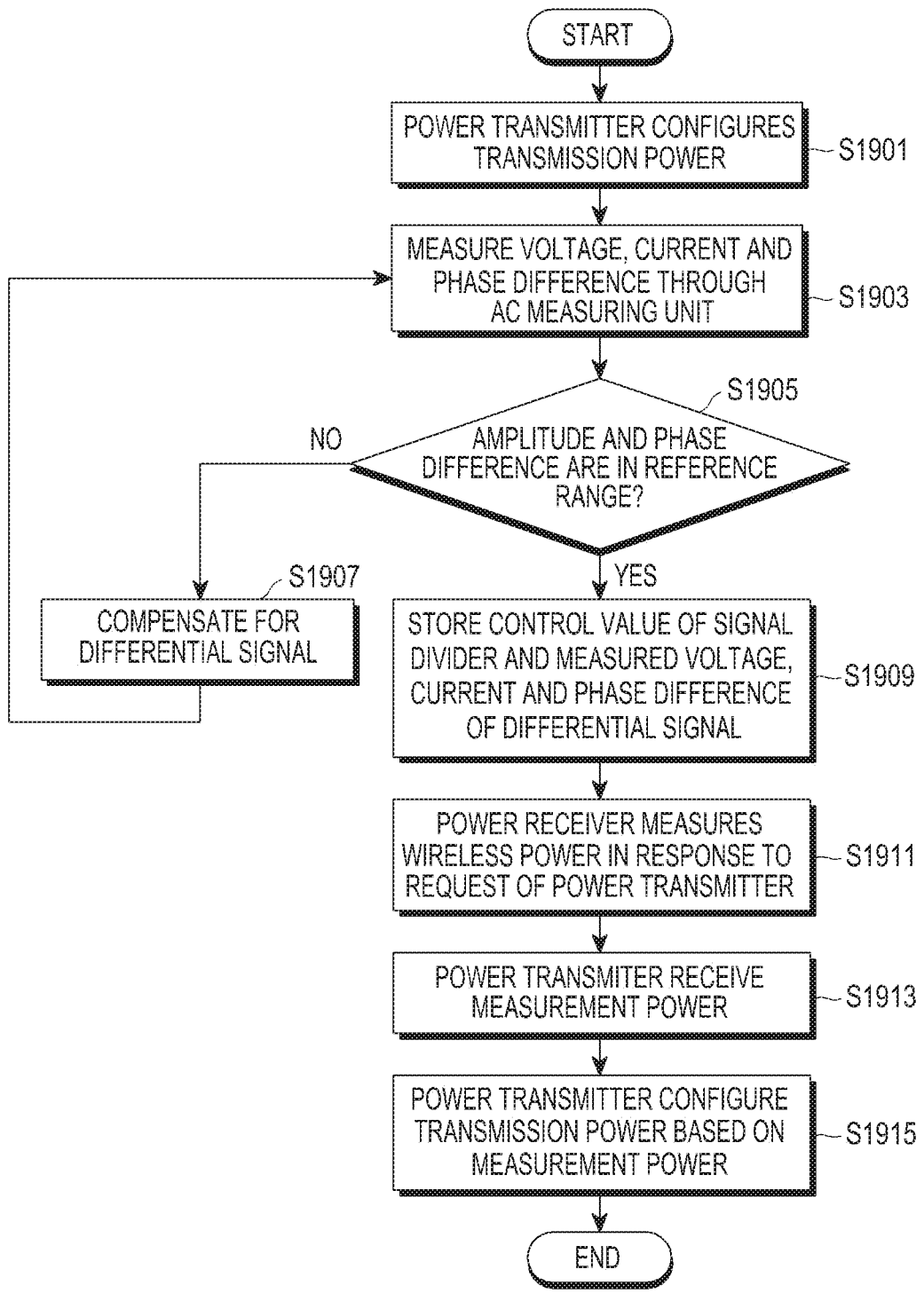
FIG. 19 is a flowchart for describing a method of controlling a wireless power transmitter according to various embodiments of the present disclosure.

FIG. 19 is a flowchart for describing a method of controlling a wireless power transmitter according to various embodiments of the present disclosure.

Referring to FIG. 18 and FIG. 19, the wireless power may perform a power tracking operation.

The wireless power transmitter 1201 may configure the wireless power PW transmitting to the wireless power receiver 1270 in operation S1901. At this time, the wireless power transmitter 1201 may periodically configure the wireless power PW.

After, the wireless power transmitter 1201 starts the transmission of the wireless power, the wireless power transmitter 1201 may control (or change) the second differential signals OUT1' and OUT2'. For example, the wireless power transmitter 1201 may control the second differential signals OUT1' and OUT2' to perform an effective and proper wireless charging.

In order to control the second differential signals OUT1' and OUT2', the wireless power transmitter 1201 may measure the voltages, currents, and phase difference of the second differential signals OUT1' and OUT2' through the AC measuring unit 1240 in operation S1903.

The wireless power transmitter 1201 may determine whether the amplitudes and the phase difference of the second differential signals OUT1' and OUT2' are in the reference range, based on the measurement result in operation S1905.

When the amplitudes and the phase difference of the second differential signals OUT1' and OUT2' are out of the reference range (no of operation S1905), the wireless power transmitter 1201 may control the second differential signals OUT1' and OUT2' in operation S1907.

When the amplitudes and the phase difference of the second differential signals OUT1' and OUT2' are in the reference range (yes of operation S1905), the wireless power transmitter 1201 may store the control value of the signal dividing unit 1220 corresponding to the second differential signals OUT1' and OUT2' and the voltages, currents and phase difference of the second differential signals OUT1' and OUT2' measured by the AC measuring unit 1240 in the memory 1250 in operation S1909. For example, the wireless power transmitter 1201 may output the wireless power PW to the wireless power receiver 1270 using the second differential signals OUT1' and OUT2' in the reference range.

The wireless power transmitter 1201 may communicate with the wireless power receiver 1270, and may request the measurement power (or measurement value) for the transmitted wireless power PW.

The wireless power receiver 1270 may measure the received wireless power in response to the request of the wireless power transmitter 1201 in operation S1911.

The wireless power transmitter 1201 may receive the measurement power MP from the wireless power receiver 1270 in operation S1913.

The wireless power transmitter 1201 may configure (or change) the wireless power output to the wireless power receiver 1270 based on the received measurement power MP in operation S1915. At this time, the wireless power transmitter 1201 may control the second differential signals OUT1' and OUT2'.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a wireless power transmitter transmitting wireless power to a wireless power receiver, the method comprising:

generating first differential signals by using a signal generated by a signal generating unit of the wireless power transmitter;

outputting second differential signals by amplifying the first differential signals;

wirelessly transmitting power by applying the second differential signals to a resonating unit of the wireless power transmitter;

detecting at least one of amplitudes or phases of the second differential signals; and in response to identifying that at least one of an amplitude difference or a phase difference between the second differential signals is out of a reference range, adjusting at least one of amplitudes or phases of the first differential signals using a variable resistor in the wireless power transmitter such that the amplitudes of the second differential signals are matched or the second differential signals are 180 degrees out of phase.

2. The method of claim 1, further comprising:

controlling the wireless power transmitter based on information on the adjusted first differential signals.

3. The method of claim 2, wherein the information on the adjusted first differential signals comprises at least one of voltage values, current values of two signals in the first differential signals, or a phase difference value between the two signals.

4. The method of claim 2, wherein the controlling of the wireless power transmitter further comprises identifying an impedance change corresponding to the wireless power receiver based on the information on the adjusted first differential signals.

5. The method of claim 2, wherein the controlling of the wireless power transmitter comprises identifying an impedance change of the wireless power receiver based on the information on the adjusted first differential signals, and entering into a latch fault mode according to an identification result.

6. The method of claim 1, wherein the adjusting of the at least one of the amplitudes or the phases of the first differential signals comprises maintaining the amplitudes and the phases of the first differential signals when the amplitude difference and the phase difference between the second differential signals are in the reference range.

7. The method of claim 1, wherein the adjusting of the at least one of the amplitudes or the phases of the first differential signals comprises adjusting the amplitudes and the phases of the first differential signals when the amplitude difference and the phase difference between the second differential signals are not in the reference range.

8. The method of claim 1, wherein the adjusting of the at least one of the amplitudes or the phases of the first differential signals comprises adjusting at least one of the amplitudes or the phases of the first differential signals based on information on wireless power received by the wireless power receiver.

9. The method of claim 8, wherein the adjusting of the at least one of the amplitudes or the phases of the first differential signals is performed in a period from a time when the wireless power transmitter transmits the wireless power to a time when the information on the wireless power is requested to the wireless power receiver.

10. A wireless power transmitter comprising:
a signal generating unit configured to generate a signal;
a signal dividing unit configured to output first differential signals by using the signal generated by the signal generating unit;
an amplifier configured to output second differential signals by amplifying the first differential signals;
a resonating unit configured to wirelessly transmit power by being applied to the second differential signals;
an alternating current (AC) measuring unit configured to measure the second differential signals applied to the resonating unit; and
a controller configured to:
control the AC measuring unit to detect at least one of amplitudes or phases of the second differential signals, and
in response to identifying that at least one of an amplitude difference or a phase difference between the second differential signals is out of a reference range, control the signal dividing unit to adjust at least one of amplitudes or phases of the first differential signals using a variable resistor in the wireless power transmitter such that the amplitudes of the second differential signals are matched or the second differential signals are 180 degrees out of phase.

11. The wireless power transmitter of claim 10, wherein the controller is further configured to control the wireless power transmitter based on information on the adjusted first differential signals.

12. The wireless power transmitter of claim 11, wherein the information on the adjusted first differential signals comprises at least one of voltage values, current values of two signals in the first differential signals, or a phase difference value between the two signals.

13. The wireless power transmitter of claim 11, wherein the controller is further configured to identify an impedance change corresponding to the wireless power receiver based on the information on the adjusted first differential signals.

14. The wireless power transmitter of claim 11, wherein the controller is further configured to:
identify an impedance change of the wireless power receiver based on the information on the adjusted first differential signals, and
identify an entrance-or-not into a latch fault mode according to an identification result.

15. The wireless power transmitter of claim 11, further comprising:
a memory configured to store the information on the first differential signals.

16. The wireless power transmitter of claim 10, wherein the controller is further configured to adjust at least one of the mplitude amplitudes or the phases of the first differential signals based on information on the wireless power received from the wireless power receiver.

17. The wireless power transmitter of claim 16, wherein the controller is further configured to adjust at least one of the amplitudes or the phases of the first differential signals in a period from a time when the wireless power transmitter transmits the wireless power to a time when the information on the wireless power is requested to the wireless power receiver.

18. The wireless power transmitter of claim 10, wherein the controller is further configured to:
identify an impedance change of the wireless power receiver, and
initialize the wireless power transmitter according to an identification result.

* * * * *